(12) United States Patent
Miyake

(10) Patent No.: US 11,201,411 B2
(45) Date of Patent: Dec. 14, 2021

(54) LIQUID CRYSTAL CELL AND SCANNING ANTENNA

(71) Applicant: Sharp Kabushiki Kaisha, Sakai (JP)

(72) Inventor: Isamu Miyake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 253 days.

(21) Appl. No.: 16/498,486

(22) PCT Filed: Mar. 23, 2018

(86) PCT No.: PCT/JP2018/011639
§ 371 (c)(1),
(2) Date: Dec. 23, 2019

(87) PCT Pub. No.: WO2018/180964
PCT Pub. Date: Oct. 4, 2018

(65) Prior Publication Data
US 2020/0388930 A1    Dec. 10, 2020

(30) Foreign Application Priority Data
Mar. 30, 2017   (JP) ............................. JP2017-068206

(51) Int. Cl.
| | | |
|---|---|---|
| *H01Q 3/44* | (2006.01) | |
| *H01Q 13/22* | (2006.01) | |
| *G02F 1/1337* | (2006.01) | |
| *G02F 1/1343* | (2006.01) | |
| *G02F 1/1368* | (2006.01) | |
| *H01Q 3/34* | (2006.01) | |
| *H01Q 21/06* | (2006.01) | |

(52) U.S. Cl.
CPC ............ *H01Q 13/22* (2013.01); *G02F 1/1337* (2013.01); *G02F 1/1343* (2013.01); *G02F 1/1368* (2013.01); *H01Q 3/34* (2013.01); *H01Q 3/44* (2013.01); *H01Q 21/06* (2013.01)

(58) Field of Classification Search
CPC .. H01Q 3/24; H01Q 3/34; H01Q 3/44; H01Q 13/10; H01Q 13/22; H01Q 21/06; H01Q 21/064; H01Q 21/20; H01Q 21/0012; G02F 1/1337; G02F 1/1343; G02F 1/1368
See application file for complete search history.

(56) References Cited

U.S. PATENT DOCUMENTS

2015/0236412 A1*   8/2015   Bily ..................... H01Q 13/106
                                                                342/374

FOREIGN PATENT DOCUMENTS

WO      2015/126550 A1    8/2015

\* cited by examiner

*Primary Examiner* — Seokjin Kim
(74) *Attorney, Agent, or Firm* — Keating & Bennett, LLP

(57) ABSTRACT

A liquid crystal cell includes a TFT substrate including a first dielectric substrate, TFTs supported by the first dielectric substrate, and patch electrodes electrically connected to the TFTs, a slot substrate including a second dielectric substrate and a slot electrode including slots and supported by the second dielectric substrate, and a liquid crystal layer sandwiched between the TFT substrate and the slot substrate that are disposed such that the patch electrodes and the slot electrode face each other. Liquid crystal molecules included in the liquid crystal layer are oriented in all azimuthal angle directions in a state in which voltage is not applied between the patch electrodes and the slot electrode.

15 Claims, 11 Drawing Sheets

LIQUID CRYSTAL CELL AND SCANNING ANTENNA

TECHNICAL FIELD

The present invention relates to a liquid crystal cell and a scanning antenna.

BACKGROUND ART

An antenna used for mobile communication, satellite broadcasting, and the like requires a beam scanning function that can change a beam direction. As the antenna having the above function, a scanning antenna utilizing a large dielectric anisotropy (birefringence) of liquid crystal material (including nematic liquid crystal and polymer dispersed liquid crystal) has been proposed (for example, Patent Document 1).

This type of scanning antenna includes a liquid crystal cell provided with antenna units. The liquid crystal cell includes a pair of substrates with electrodes and a liquid crystal layer arranged between the two substrates, and each antenna unit is constituted of the electrodes of the substrates and the liquid crystal layer therebetween.

The scanning antenna adjusts capacitance of each antenna unit by controlling voltage applied to the liquid crystal layer of each antenna unit and changing an effective dielectric constant of the liquid crystal layer of each antenna unit. And a phase difference corresponding to the capacitance of each antenna unit is given to electromagnetic waves transmitted and received by the scanning antenna.

An alignment film for controlling an orientation direction of liquid crystal molecules is provided in the substrate of the liquid crystal cell on a side of the liquid crystal layer.

RELATED ART DOCUMENT

Patent Document

Patent Document 1: WO 2015/126550

Problem to be Solved by the Invention

Conventionally, in the liquid crystal cell for scanning antenna, a relationship between antenna characteristics and the orientation direction of liquid crystal molecules caused by the alignment film has not been verified at all.

For example, when the alignment film subjected to alignment treatment by rubbing or light irradiation is used as in the case of an alignment film for the conventional liquid crystal display applications, the liquid crystal molecules are subjected to action (alignment restriction force) of the alignment film in a state in which voltage is not applied, and meanwhile, become a state of being oriented along one direction in a substrate surface. FIG. 15 is an explanatory view showing a state in which the liquid crystal molecules are oriented along one direction with respect to a substrate surface 101P by the action of the alignment film in the conventional liquid crystal cell.

Among the liquid crystal molecules oriented in this manner, there are present: a liquid crystal molecule lc1 (hereinafter, a first liquid crystal molecule lc1) rising from the substrate surface 101P in a polar angle direction at a predetermined angle (for example, 2 to 3°) and oriented at a predetermined azimuthal angle direction (for example, the azimuthal angle is 0°); and a liquid crystal molecule lc2 (hereinafter, a second liquid crystal molecule lc2) oriented by rising in the polar angle direction at the predetermined angle in a state of being reversed by 180° from the first liquid crystal molecule lc1 (for example, in a direction at which the azimuthal angle is 180°).

Although the liquid crystal molecules are independent of one another, in a nematic phase, the liquid crystal molecules are known to behave as a continuous matter (continuous body) as a whole. Therefore, as described above, between the first liquid crystal molecule lc1 and the second liquid crystal molecule lc2 in which the azimuthal angle directions are opposite to each other, a liquid crystal molecule lc3 (hereinafter, a third liquid crystal molecule lc3) which is parallel to the substrate surface 101P is inevitably present due to a requirement of continuity of liquid crystal orientation of the nematic phase. The above third liquid crystal molecule lc3 has the polar angle (pretilt angle) of 0°, which causes the pretilt angle of the entire liquid crystal molecules to be reduced.

When the liquid crystal molecule (third liquid crystal molecule lc3) having the pretilt angle of 0° is present in the liquid crystal molecules constituting the liquid crystal layer, a response speed to a capacitance change of the liquid crystal cell becomes slow, which has been a problem.

DISCLOSURE OF THE PRESENT INVENTION

An object of the present invention is to provide a liquid crystal cell for scanning antenna having a high response speed to the capacitance change, and a scanning antenna including the liquid crystal cell.

Means for Solving the Problem

The liquid crystal cell according to the present invention is a liquid crystal cell in which antenna units are arranged. The liquid crystal cell includes: a thin film transistor (TFT) substrate including a first dielectric substrate, TFTs supported by the first dielectric substrate, and patch electrodes electrically connected to the TFTs; a slot substrate including a second dielectric substrate, and a slot electrode including slots and supported by the second dielectric substrate; and a liquid crystal layer sandwiched between the TFT substrate and the slot substrate that are disposed such that the patch electrodes and the slot electrode face each other. In the liquid crystal cell, liquid crystal molecules included in the liquid crystal layer are oriented in all azimuthal angle directions as a whole in a state in which voltage is not applied between the patch electrodes and the slot electrode.

In the liquid crystal cell, the liquid crystal molecules are preferably of a horizontally oriented type. In the present description, the liquid crystal molecules of the horizontally oriented type refer to those in which a major axis direction of each of the liquid crystal molecules is arranged substantially parallel to the substrate surface in the state in which voltage is not applied.

In the liquid crystal cell, the TFT substrate may include a first alignment film on a surface thereof that is in contact with the liquid crystal layer, and the slot substrate may include a second alignment film on a surface thereof that is in contact with the liquid crystal layer.

In the liquid crystal cell, the first alignment film and the second alignment film are preferably not subjected to an alignment treatment.

In the liquid crystal cell, the first alignment film and the second alignment film may be made of a polyimide-based resin.

In the liquid crystal cell, the TFT substrate may have a first hydrophilic surface formed by subjecting a surface in contact with the liquid crystal layer to a hydrophilization treatment, and the slot substrate may have a second hydrophilic surface formed by subjecting a surface in contact with the liquid crystal layer to the hydrophilization treatment.

In the liquid crystal cell, the first hydrophilic surface and the second hydrophilic surface may be formed by bringing an alkaline dilute solution into contact with the surface in contact with the liquid crystal layer.

In the liquid crystal cell, the liquid crystal molecules included in the liquid crystal layer may be in flow orientation.

In the liquid crystal cell, a pretilt angle of the liquid crystal molecules constituting the liquid crystal layer is preferably 1° to 20° from the viewpoint of the response speed. Further, in order to increase capacitance modulation, the pretilt angle of 1 to 10° is particularly preferable.

In the liquid crystal cell, an orientation degree A of the liquid crystal layer constituting the liquid crystal layer is preferably in a range of 1 to 10.

In the liquid crystal cell, in a state where voltage is applied between the slot electrode and the patch electrodes, an oblique electric field in which an angle of an electric field vector to the substrate surface is less than 90° is preferably formed between the slot electrode and the patch electrodes.

In the liquid crystal cell, the slots of the slot electrode are preferably arranged to correspond to the patch electrodes so as to constitute the antenna unit.

In the liquid crystal cell, the liquid crystal layer preferably contains, as the liquid crystal molecules, those having a dielectric constant anisotropy ($\Delta\varepsilon$) of 10 (1 kHz, 20° C.) or more.

In the liquid crystal cell, the liquid crystal molecules each preferably have an isothiocyanate group at an end of the molecule.

Further, the scanning antenna according to the present invention includes the liquid crystal cell according to any of the above and a reflective conductive plate arranged so as to face an outer main surface of the second dielectric substrate of the liquid crystal cell with a dielectric layer between the reflective conductive plate and the second dielectric substrate.

Advantageous Effect of the Invention

According to the present invention, a liquid crystal cell for scanning antenna having a high response speed to the capacitance change, and a scanning antenna including the liquid crystal cell can be provided.

MODES FOR CARRYING OUT THE INVENTION

First Embodiment (Basic Structure of Scanning Antenna)

A scanning antenna has a beam scanning function that can change a beam direction, and has a structure including antenna units utilizing an anisotropy (birefringence) of a large dielectric constant m ($\varepsilon$m) of liquid crystal material. The scanning antenna controls voltage applied to a liquid crystal layer of each antenna unit, and changes the effective dielectric constant m ($\varepsilon$m) of the liquid crystal layer of each antenna unit, thereby forming a two-dimensional pattern with antenna units having different capacitance. Note that, because the dielectric constant of the liquid crystal material has frequency dispersion, in the present description, the dielectric constant in the microwave frequency band is particularly referred to as "dielectric constant m ($\varepsilon$m)".

Electromagnetic waves (for example, microwaves) emitted from the scanning antenna or received by the scanning antenna are given a phase difference corresponding to the capacitance of each antenna unit, and corresponding to the two-dimensional pattern formed by antenna units having different capacitance, the electromagnetic waves have strong directivity in a specific direction (beam scanning). For example, the electromagnetic waves emitted from the scanning antenna are obtained by integrating spherical waves obtained as a result of input electromagnetic waves being incident in each antenna unit and scattered in each antenna unit, by taking into consideration the phase difference given by each antenna unit.

Figure 1:
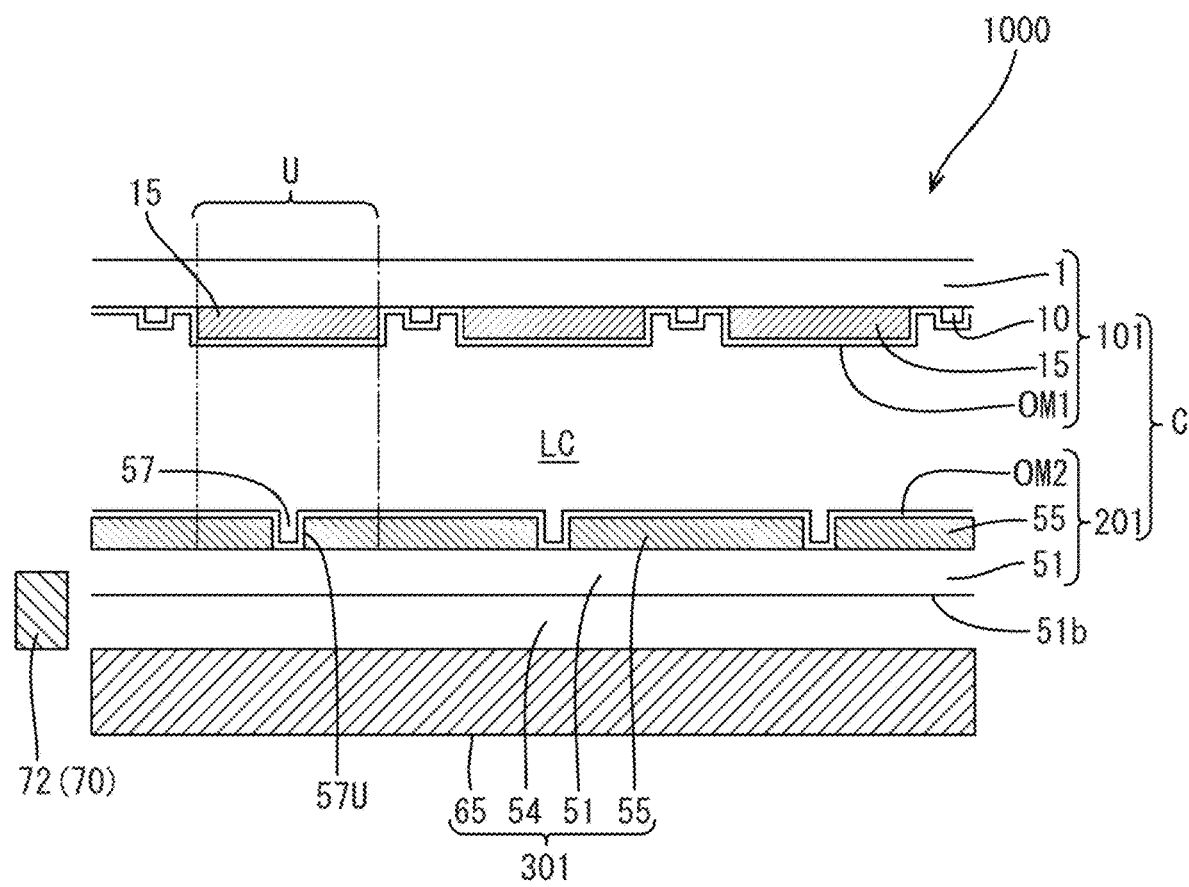
FIG. 1 is a cross-sectional view schematically showing a part of a scanning antenna according to a first embodiment.

Here, a basic structure of a scanning antenna according to a first embodiment is described with reference to FIG. 1 and the like. FIG. 1 is a cross-sectional view schematically showing a part of the scanning antenna 1000 according to a first embodiment. The scanning antenna 1000 of the present embodiment is a radial inline slot antenna in which slots 57 are arranged concentrically. FIG. 1 schematically shows a part of a cross section along a radial direction from a power feed pin 72 provided in a vicinity of a center of the concentrically arranged slots. Note that in other embodiments, arrangement of the slots may be various known arrangements (such as spiral shape and matrix shape).

The scanning antenna 1000 mainly includes a TFT substrate 101, a slot substrate 201, a liquid crystal layer LC arranged therebetween, and a reflective conductive plate 65. The scanning antenna 1000 is configured to transmit and receive the microwaves from a side of the TFT substrate 101. The TFT substrate 101 and the slot substrate 201 are arranged to face each other with the liquid crystal layer LC interposed therebetween.

The TFT substrate 101 includes a dielectric substrate 1 (first dielectric substrate) such as a glass substrate, patch electrodes 15 and TFTs (thin film transistors) 10 formed on a side of the liquid crystal layer LC of the dielectric substrate 1, and an alignment film OM1 (first alignment film) formed on the outermost surface on the side of the liquid crystal layer LC. Each TFT 10 is connected with a gate bus line and a source bus line not shown in FIG. 1.

The slot substrate 201 includes a dielectric substrate 51 (second dielectric substrate) such as a glass substrate, a slot electrode 55 formed on the side of the liquid crystal layer LC of the dielectric substrate 51, and an alignment film OM2 (second alignment film) formed on the outermost surface on the side of the liquid crystal layer LC. The slot electrode 55 is provided with the slots 57.

The dielectric substrates 1, 51 used for the TFT substrate 101 and the slot substrate 201 preferably have a small dielectric loss to microwaves, and a plastic substrate can be used other than the glass substrate. A thickness of the dielectric substrates 1, 51 is not particularly limited, but is preferably 400 μm or less, and more preferably 300 μm or less, for example. The lower limit of the thickness of the dielectric substrates 1, 51 is not particularly limited as long as the dielectric substrates have a strength that can withstand in a production process or the like.

The reflective conductive plate 65 is arranged to face the slot substrate 201 with an air layer 54 interposed therebetween. In other embodiments, instead of the air layer 54, a layer formed of a dielectric having a small dielectric constant m to microwaves (for example, a fluorine resin such as polytetrafluoroethylene (PTFE)) may be used. In the scanning antenna 1000 of the present embodiment, the slot electrode 55, the reflective conductive plate 65, and the dielectric substrate 51 and the air layer 54 between the above two function as a waveguide 301.

The patch electrodes 15, a portion of the slot electrode 55 including the slots 57 (hereinafter may be referred to as a "slot electrode unit 57U"), and the liquid crystal layer LC between the above two constitute an antenna unit U. In each antenna unit U, one island-shaped patch electrode 15 faces one hole-shaped slot 57 (slot electrode unit 57U) with the liquid crystal layer LC interposed therebetween, to constitute a liquid crystal capacitance. In the scanning antenna 1000 of the present embodiment, the antenna units U are arranged concentrically. The antenna unit U includes an auxiliary capacitance electrically connected in parallel to the liquid crystal capacitance.

The slot electrode 55 constitutes the antenna unit U in each slot electrode unit 57U and also functions as a wall of the waveguide 301. Therefore, the slot electrode 55 needs to have a function of suppressing transmission of microwaves, and is formed of a relatively thick metal layer. As the metal layer described above, for example, a copper (Cu) layer, an aluminum (Al) layer, and the like are mentioned. For example, in order to reduce the microwave of 10 GHz to 1/150, a thickness of the Cu layer is set to 3.3 μm or more, and a thickness of the Al layer is set to 4.0 μm or more. Also, in order to reduce the microwave of 30 GHz to 1/150, the thickness of the Cu layer is set to 1.9 μm or more, and the thickness of the Al layer is set to 2.3 μm or more. An upper limit of the thickness of the metal layer constituting the slot electrode 55 is not particularly limited, but in consideration of forming the alignment film OM2 as described later, it can be said that the metal layer is preferably as thin as possible. When the Cu layer is used as the metal layer, there is an advantage that the layer can be made thinner than the Al layer. As a method of forming the slot electrode 55, a thin film deposition method used in the conventional liquid crystal display device technology, or another method such as affixing a metal foil (for example, a Cu foil or Al foil) on a substrate may be used. The thickness of the metal layer is set to, for example, 2 μm or more and 30 μm or less. When the thin film deposition method is used to form the metal layer, the thickness of the metal layer is set to, for example, 5 μm or less. As the reflective conductive plate 65, for example, an aluminum plate, copper plate, or the like having a thickness of several mm can be used.

Unlike the slot electrode 55, the patch electrodes 15 do not constitute the waveguide 301, and accordingly, is formed of a metal layer thinner than the slot electrode 55. In order to avoid a loss caused when vibration of free electrons in the vicinity of the slots 57 of the slot electrode 55 induces vibration of free electrons in the patch electrodes 15 and is converted to heat, a resistance is preferably low. From a viewpoint of mass productivity and the like, the Al layer is preferably used rather than the Cu layer. For example, a thickness of the Al layer is preferably 0.5 μm or more and 2 μm or less.

An arrangement pitch of the antenna unit U is set to, for example, $\lambda/4$ or less, and/or $\lambda/5$ or less, where $\lambda$ is a wavelength of the microwave. The wavelength $\lambda$ is, for example, 25 mm, and the arrangement pitch in that case is set, for example, to 6.25 mm or less, and/or 5 mm or less.

The scanning antenna 1000 changes a phase of the microwave excited (re-radiated) from each patch electrode 15 by changing a capacitance value of the liquid crystal capacitance that the antenna unit U has. Therefore, as the liquid crystal layer LC, the anisotropy ($\Delta\varepsilon m$) of the dielectric constant m ($\varepsilon m$) to microwaves is preferably large, and tan $\delta m$ (dielectric loss tangent to microwaves) is preferably small.

Although the dielectric constant of the liquid crystal material generally has frequency dispersion, a dielectric anisotropy $\Delta\varepsilon m$ to microwaves has a positive correlation with a refractive index anisotropy $\Delta n$ to the visible light. Therefore, the liquid crystal material for the antenna unit for microwaves is preferably material having a large refractive index anisotropy $\Delta n$ to the visible light. Here, when $\Delta n$ (birefringence) to light of 550 nm is used as an index, nematic liquid crystal with $\Delta n$ of 0.3 or more, preferably 0.4 or more is used for an antenna unit for microwaves. The upper limit of $\Delta n$ is not particularly limited. The thickness of the liquid crystal layer LC is set to, for example, 1 μm or more and 500 μm or less.

Note that the details of the liquid crystal material (liquid crystal compound) constituting the liquid crystal layer LC is described later.

Figure 2:
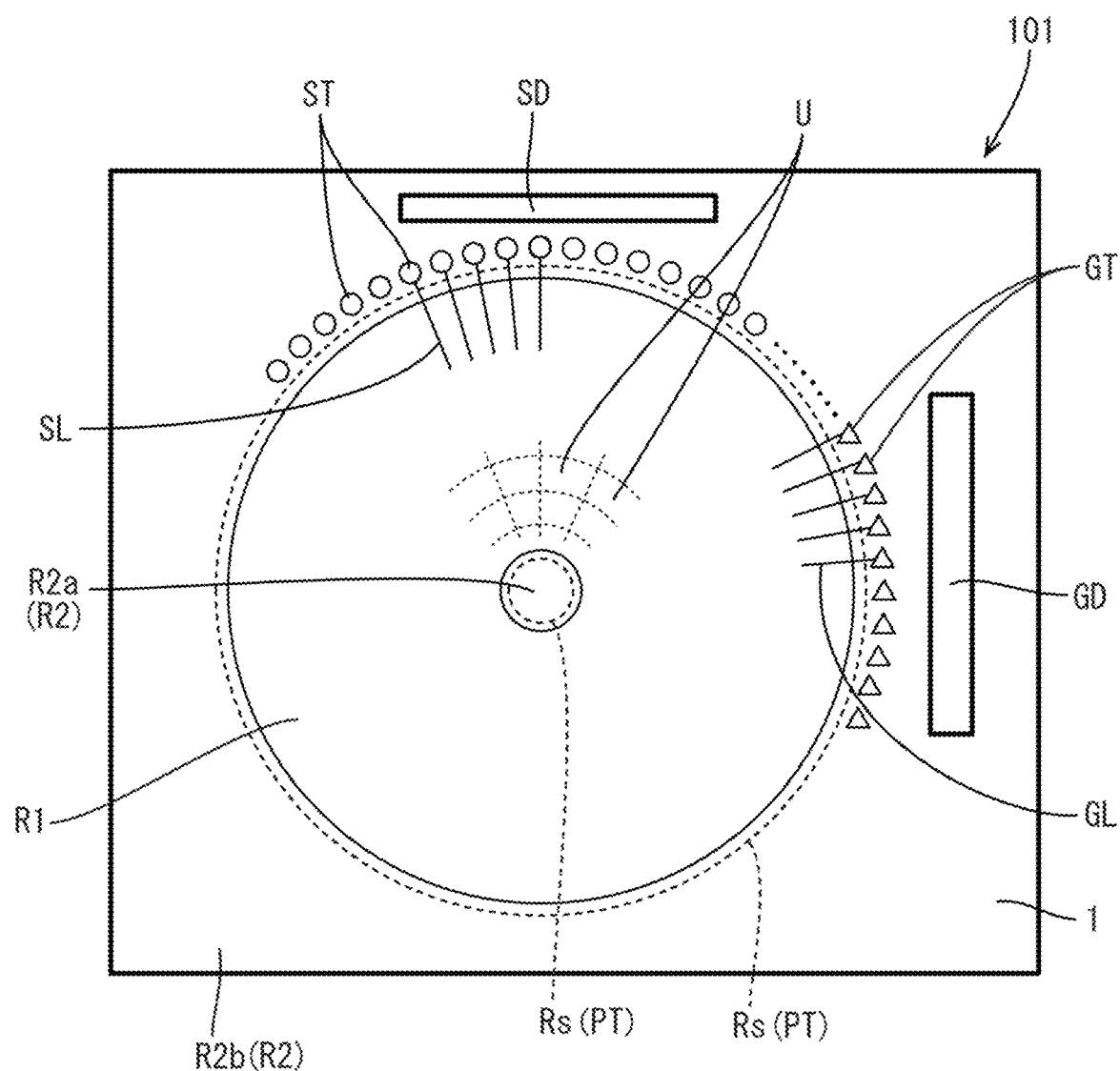
FIG. 2 is a plan view schematically showing a TFT substrate provided in the scanning antenna.
Figure 3:
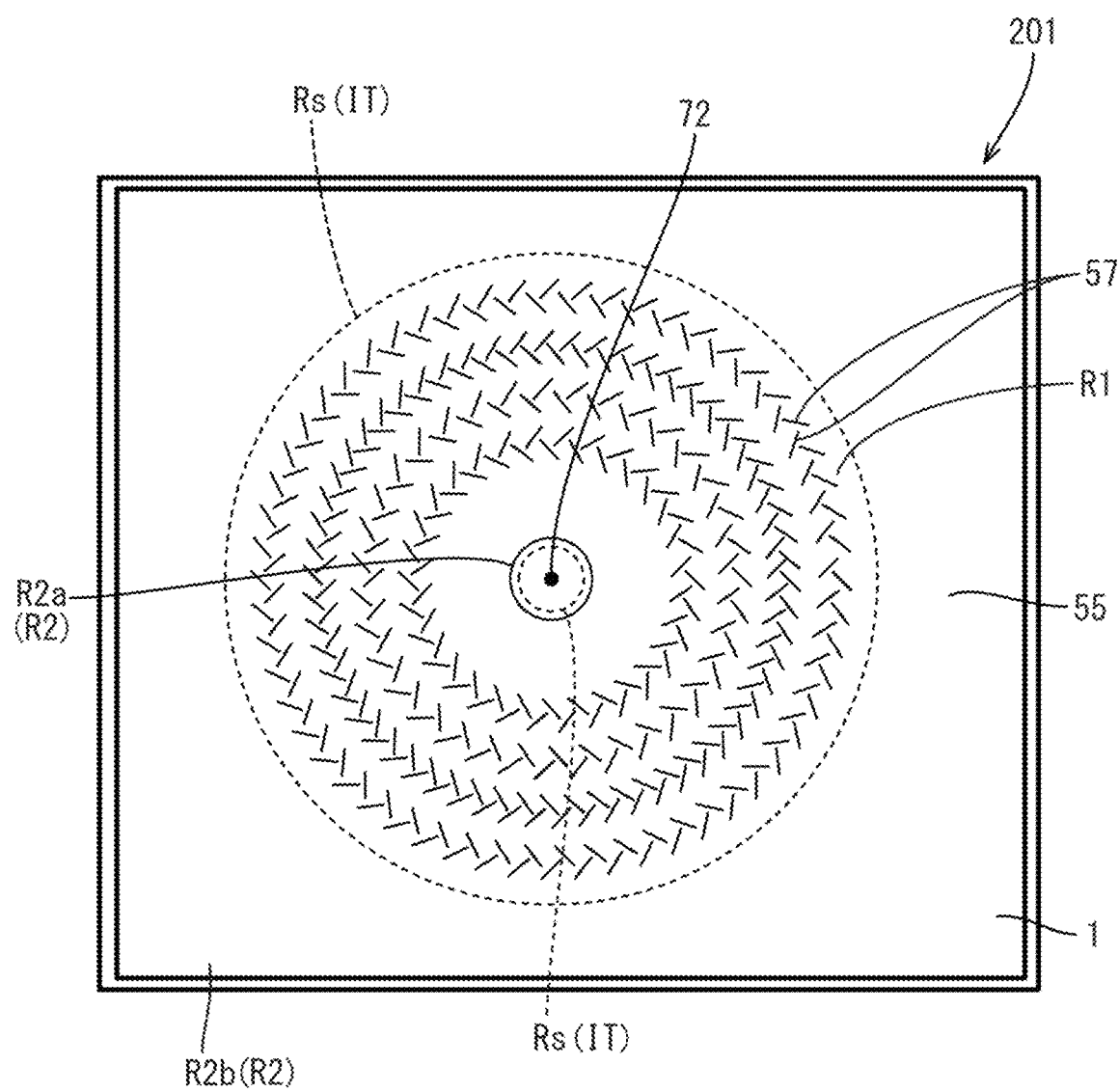
FIG. 3 is a plan view schematically showing a slot substrate provided in the scanning antenna.

FIG. 2 is a plan view schematically showing the TFT substrate 101 provided in the scanning antenna 1000, and FIG. 3 is a plan view schematically showing the slot substrate 201 provided in the scanning antenna 1000. A region of the TFT substrate 101 and a region of the slot substrate 201 corresponding to the antenna unit U are both referred to as "antenna unit region" for convenience of explanation, and the same reference symbol as that of the antenna unit is referred to as the reference symbols thereof. Further, as shown in FIGS. 2 and 3, in the TFT substrate 101 and the slot substrate 201, a region defined by the two-dimensionally arranged antenna unit regions U is referred to as "transmission/reception region R1", and a region other than the transmission/reception region R1 is referred to as "non-transmission/reception region R2". A terminal part, a drive circuit, and the like are provided in the non-transmission/reception region R2.

The transmission/reception region R1 has an annular shape in plan view. The non-transmission/reception region R2 includes a first non-transmission/reception region R2a located at a center part of the transmission/reception region R1 and a second non-transmission/reception region R2b arranged at a periphery of the transmission/reception region R1. An outer diameter of the transmission/reception region R1 is, for example, 200 mm or more and 1,500 mm or less, and is appropriately set depending on an amount of communication and the like.

Gate bus lines GL and source bus lines SL supported by the derivative substrate 1 are provided in the transmission/reception region R1 of the TFT substrate 101, and driving of each antenna unit region U is controlled using the above lines. Each antenna unit region U includes the TFT 10 and the patch electrode 15 electrically connected to the TFT 10. A source electrode of the TFT 10 is electrically connected to the source bus line SL, and a gate electrode is electrically connected to the gate bus line GL. A drain electrode of the TFT 10 is electrically connected to the patch electrode 15.

In the non-transmission/reception region R2 (first non-transmission/reception region R2a, second non-transmission/reception region R2b), seal regions Rs are arranged in which a sealing material (not shown) are formed to surround the transmission/reception region R1. The sealing material has a function of causing the TFT substrate 101 and the slot substrate 201 to adhere to each other and also sealing the liquid crystal material (liquid crystal layer LC) between the substrates 101, 201.

Gate terminal parts GT, a gate driver GD, source terminal parts ST, and a source driver SD are arranged outside the seal region R2 among the non-transmission/reception region R2. Each gate bus line GL is connected to the gate driver GD via each gate terminal part GT, and each source bus line SL is connected to the source driver SD via each source terminal part ST. In the present embodiment, both the source driver SD and the gate driver GD are formed on the dielectric substrate 1 of the TFT substrate 101. However, one or both of the drivers may be formed on the dielectric substrate 51 of the slot substrate 201.

Transfer terminal parts PT are provided in the non-transmission/reception region R2. The transfer terminal parts PT are electrically connected to the slot electrode 55 of the slot substrate 201. In the present embodiment, the transfer terminal parts PT are arranged in both the first non-transmission/reception region R2a and the second non-transmission/reception region R2b. In other embodiments, the transfer terminal part PT may be configured to be arranged in only one of the regions. Further, in the case of the present embodiment, the transfer terminal parts PT are respectively arranged in the seal regions Rs. Therefore, a conductive resin containing conductive particles (conductive beads) is used as the sealing material.

As shown in FIG. 3, in the slot substrate 201, the slot electrode 55 is formed on the dielectric substrate 51 so as to extend over the transmission/reception region R1 and the non-transmission/reception region R2. Note that FIG. 3 shows a surface of the slot substrate 201 as viewed from the side of the liquid crystal layer LC, and the alignment film OM2 formed on the outermost surface is removed for the convenience of explanation.

In the transmission/reception region R1 of the slot substrate 201, the slots 57 are provided in the slot electrode 55. These slots 57 are allocated one by one to the antenna unit region U of the TFT substrate 101. In the case of the present embodiment, the slots 57 are arranged such that a pair of slots 57 extending in directions substantially orthogonal to each other is concentrically arranged so as to constitute a radial inline slot antenna. By having the pair of slots 57 described above, the scanning antenna 1000 can transmit and receive circularly polarized waves.

Terminal parts IT of the slot electrode 55 are provided in the non-transmission/reception region R2 of the slot substrate 201. The terminal parts IT are electrically connected to the transfer terminal parts PT of the TFT substrate 101. In the case of the present embodiment, the terminal parts IT are respectively arranged in the seal regions Rs, and as described above, are electrically connected to the corresponding transfer terminal parts PT by the sealing material made of the conductive resin containing the conductive particles (conductive beads).

In the first non-transmission/reception region R2a, the power feed pin 72 is provided at the center of a concentric circle formed by the slots 57. The power feed pin 72 supplies the microwaves to the waveguide 301 constituted of the slot electrode 55, the reflective conductive plate 65, and the dielectric substrate 51. The power feed pin 72 is connected to a power feed device 70. The feeding method may be either a direct feeding method or an electromagnetic coupling method, and a known feeding structure can be adopted.

The TFT substrate 101, the slot substrate 201, and the waveguide 301 are described in detail below.

(Structure of TFT Substrate 101)

Figure 4:
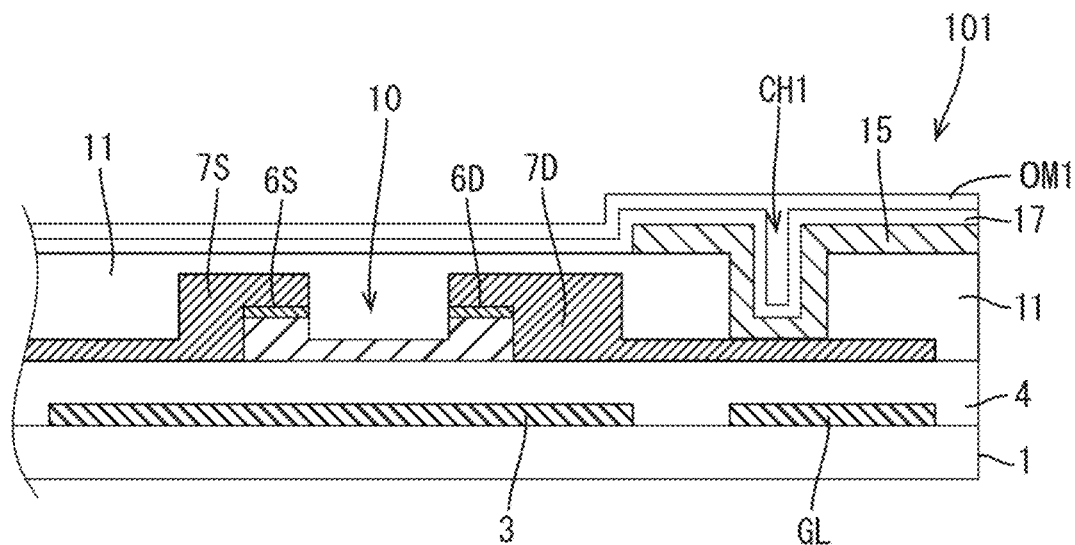
FIG. 4 is a cross-sectional view schematically showing an antenna unit region of the TFT substrate.
Figure 5:
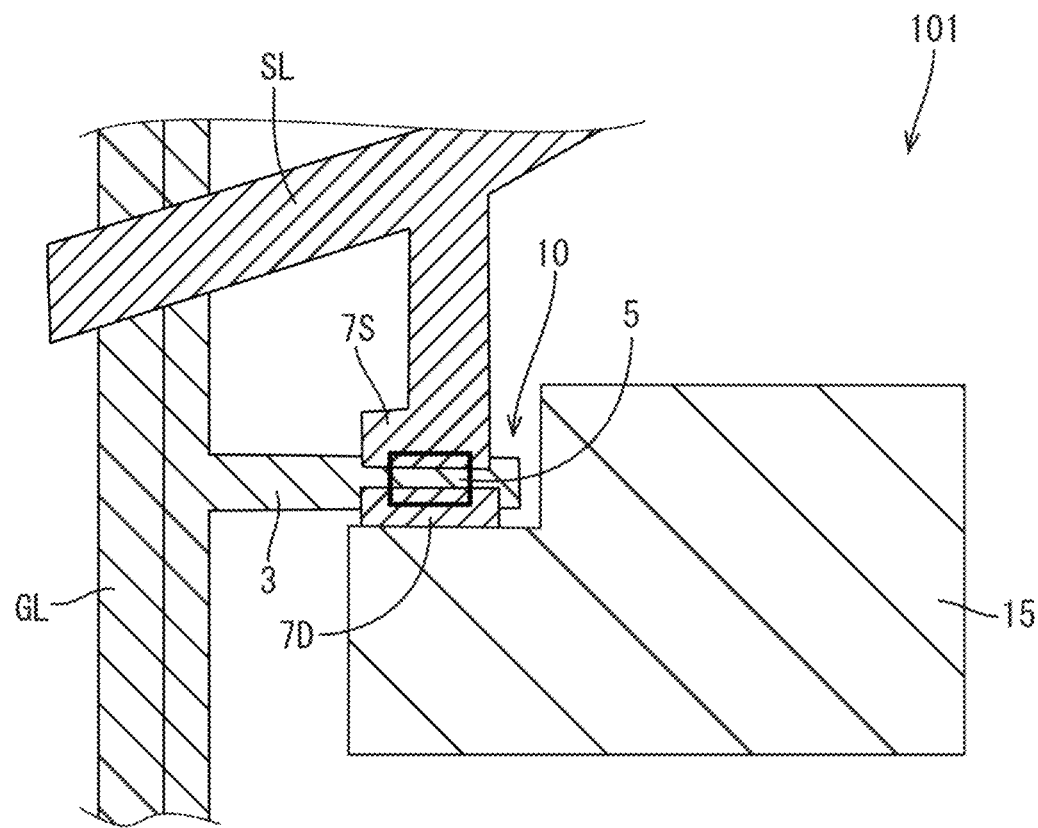
FIG. 5 is a plan view schematically showing the antenna unit region of the TFT substrate.

FIG. 4 is a cross-sectional view schematically showing the antenna unit region U of the TFT substrate 101, and FIG. is a plan view schematically showing the antenna unit region U of the TFT substrate 101. FIGS. 4 and 5 each show a cross-sectional configuration of a part of the transmission/reception region R1.

Each antenna unit region U of the TFT substrate 101 includes the dielectric substrate 1 (first dielectric substrate), the TFT 10 supported by the dielectric substrate 1, a first insulating layer 11 covering the TFT 10, the patch electrode 15 formed on the first insulating layer 11 and electrically connected to the TFT 10, a second insulating layer 17 covering the patch electrode 15, and the alignment film OM1 covering the second insulating layer 17.

The TFT 10 includes a gate electrode 3, an island-shaped semiconductor layer 5, a gate insulating layer 4 arranged between the gate electrode 3 and the semiconductor layer 5, a source electrode 7S, and a drain electrode 7D. The TFT 10 of the present embodiment is a channel etch type TFT having a bottom gate structure. In other embodiments, TFTs having other structures may be used.

The gate electrode 3 is electrically connected to the gate bus line GL, and a scan signal is supplied from the gate bus line GL. The source electrode 7S is electrically connected to the source bus line SL, and a data signal is supplied from the source bus line SL. The gate electrode 3 and the gate bus line GL may be formed of the same conductive film (gate conductive film). Further, the source electrode 7S, the drain electrode 7D, and the source bus line SL may be formed of the same conductive film (source conductive film). The gate conductive film and the source conductive film are made of, for example, a metal film. Note that a layer formed using the gate conductive film may be referred to as "gate metal layer", and a layer formed using the source conductive film may be referred to as "source metal layer".

The semiconductor layer 5 is arranged so as to overlap with the gate electrode 3 with the gate insulating layer 4 interposed therebetween. As shown in FIG. 5, a source contact layer 6S and a drain contact layer 6D are formed on the semiconductor layer 5. The source contact layer 6S and the drain contact layer 6D are arranged in a manner of facing each other on both sides of a region in the semiconductor layer 5 in which a channel is to be formed (channel region). In the case of the present embodiment, the semiconductor layer 5 is made of an intrinsic amorphous silicon (i-a-Si) layer, and the source contact layer 6S and the drain contact layer 6D are made of $n^+$ type amorphous silicon ($n^+$-a-Si) layers. In other embodiments, the semiconductor layer 5 may be formed of a polysilicon layer, an oxide semiconductor layer, or the like.

The source electrode 7S is provided so as to be in contact with the source contact layer 6S, and is connected to the semiconductor layer 5 via the source contact layer 6S. The drain electrode 7D is provided so as to be in contact with the drain contact layer 6D, and is connected to the semiconductor layer 5 via the drain contact layer 6D.

The first insulating layer 11 includes a contact hole CH1 reaching the drain electrode 7D of the TFT 10.

The patch electrode 15 is provided on the first insulating layer 11 and in the contact hole CH1, and is in contact with the drain electrode 7D in the contact hole CH1. The patch electrode 15 is mainly constituted of a metal layer. The patch electrode 15 may be a metal electrode formed only of the metal layer. Material of the patch electrode 15 may be the same as that of the source electrode 7S and the drain electrode 7D. A thickness of the metal layer in the patch electrode 15 (thickness of the patch electrode 15 when the patch electrode 15 is the metal electrode) may be the same as but preferably larger than a thicknesses of the source electrode 7S and the drain electrode 7D. When the thickness of the patch electrode 15 is large, a transmittance of the electromagnetic wave is suppressed low, a sheet resistance of the patch electrode is reduced, and a loss caused when vibration of free electrons in the patch electrode is converted to heat is reduced.

In addition, a capacitive (CS) bus line CL may be provided using the same conductive film as the gate bus line GL. The CS bus line CL is arranged so as to overlap with the drain electrode 7D (or an extended portion of the drain electrode 7D) with the gate insulating layer 4 interposed therebetween, and may constitute an auxiliary capacitance CS having the gate insulating layer 4 as a dielectric layer.

In the present embodiment, the patch electrode 15 is formed in a layer different from the source metal layer. Therefore, the thickness of the source metal layer and the thickness of the patch electrode 15 can be controlled independently of each other.

The patch electrode 15 may include a Cu layer or Al layer as a main layer. The performance of the scanning antenna is correlated with the electrical resistance of the patch electrode 15, and a thickness of the main layer is set such that a desired resistance is obtained. The patch electrode 15 preferably has a low resistance to the extent of not inhibiting the vibration of electrons. The thickness of the metal layer in the patch electrode 15 is set to, for example, 0.5 µm or more when formed of the Al layer.

The alignment film OM1 is made of, for example, a polyimide-based resin. Details of the alignment film OM1 is described later.

The TFT substrate 101 is produced, for example, by a method shown below. First, the dielectric substrate 1 is prepared. As the derivative substrate 1, for example, a glass substrate, a plastic substrate having heat resistance, or the like can be used. The gate metal layer including the gate electrode 3 and the gate bus line GL is formed on the dielectric substrate 1.

The gate electrode 3 can be integrally formed with the gate bus line GL. Here, the gate conductive film (thickness of, for example, 50 nm or more and 500 nm or less) is formed on the dielectric substrate 1 by a sputtering method or the like. Next, the gate electrode 3 and the gate bus line GL are formed by patterning the gate conductive film. Material of the gate conductive film is not particularly limited, but for example, a film containing a metal such as aluminum (Al), tungsten (W), molybdenum (Mo), tantalum (Ta), chromium (Cr), titanium (Ti), copper (Cu), or a metal alloy thereof, or a metal nitride thereof can be used as appropriate. Here, a stacked film is formed by stacking molybdenum nitride (MoN, thickness of, for example, 50 nm), Al (thickness of, for example, 200 nm), and MoN (thickness of, for example, 50 nm) in this order as the gate conductive film.

Next, the gate insulating layer 4 is formed so as to cover the gate metal layer. The gate insulating layer 4 can be formed by a chemical vapor deposition (CVD) method or the like. As the gate insulating layer 4, a silicon oxide ($SiO_2$) layer, a silicon nitride (SiNx) layer, a silicon oxynitride (SiOxNy; x>y) layer, a silicon nitride oxide (SiNxOy; x>y) layer, or the like can be suitably used. The gate insulating layer 4 may have a stacked structure. Here, the SiNx layer (thickness of, for example, 410 nm) is formed as the gate insulating layer 4.

Next, the semiconductor layer 5 and a contact layer are formed on the gate insulating layer 4. Here, the intrinsic amorphous silicon film (thickness of, for example, 125 nm) and the $n^+$ type amorphous silicon film (thickness of, for example, 65 nm) are formed in this order and are patterned to obtain the island-shaped semiconductor layer 5 and the contact layer. The semiconductor film used for the semiconductor layer 5 is not limited to the amorphous silicon film. For example, an oxide semiconductor layer may be formed as the semiconductor layer 5. In this case, the contact layer may not be provided between the semiconductor layer 5 and the source and drain electrodes.

Then, the source conductive film (thickness of, for example, 50 nm or more and 500 nm or less) is formed on the gate insulating layer 4 and the contact layer, and is patterned to form the source metal layer including the source electrode 7S, the drain electrode 7D and the source bus line SL. At this time, the contact layer is also etched to form the source contact layer 6S and the drain contact layer 6D which are separated from each other.

Material of the source conductive film is not particularly limited, and a film containing a metal such as aluminum (Al), tungsten (W), molybdenum (Mo), tantalum (Ta), chromium (Cr), titanium (Ti), copper (Cu), or a metal alloy thereof, or a metal nitride thereof can be used as appropriate, for example. Here, a stacked film is formed by stacking MoN (thickness of, for example, 30 nm), Al (thickness of, for example, 200 nm), and MoN (thickness of, for example, 50 nm) in this order as the source conductive film.

Here, for example, the source conductive film is formed by the sputtering method, and is patterned (source/drain separated) by wet etching. Thereafter, a portion of the contact layer located on a region to be the channel region of the semiconductor layer 5 is removed by, for example, dry etching, to form a gap part and to separate the contact layer into the source contact layer 6S and the drain contact layer 6D. At this time, in the gap part, a vicinity of a surface of the semiconductor layer 5 is also etched (over-etched).

Next, the first insulating layer 11 is formed so as to cover the TFT 10. In this example, the first insulating layer 11 is arranged so as to be in contact with the channel region of the semiconductor layer 5. Further, the contact hole CH1 reaching the drain electrode 7D is formed in the first insulating layer 11 by a known photolithography technique.

The first insulating layer 11 may be, for example, an inorganic insulating layer such as a silicon oxide ($SiO_2$) film, a silicon nitride (SiNx) film, a silicon oxynitride (SiOxNy; x>y) film, or a silicon nitride oxide (SiNxOy; x>y) film. Here, the SiNx layer having a thickness of, for example, 330 nm is formed as the first insulating layer 11 by, for example, the CVD method.

Next, a patch conductive film is formed on the first insulating layer 11 and in the contact hole CH1, and is patterned. Thereby, the patch electrode 15 is formed in the transmission/reception region R1. In the non-transmission/reception region R2, a patch connection part made of the same conductive film (patch conductive film) as the patch electrode 15 is formed. The patch electrode 15 is in contact with the drain electrode 7D in the contact hole CH1.

As material of the patch conductive film, the same material as the gate conductive film or source conductive film can be used. However, the patch conductive film is preferably set to be thicker than the gate conductive film and the source conductive film. A suitable thickness of the patch conductive film, for example, 1 μm or more and 30 μm or less. If the film is thinner than this, the transmittance of electromagnetic waves becomes about 30% and the sheet resistance becomes 0.03 Ω/sq or more, which may cause a problem of increase in loss, and if the film is thicker than this, a problem that a patterning property of the slots 57 is degraded may occur.

Here, a stacked film (MoN/Al/MoN) is formed by stacking MoN (thickness of, for example, 50 nm), Al (thickness of, for example, 1000 nm), and MoN (thickness of, for example, 50 nm) in this order as the patch conductive film.

Next, the second insulating layer 17 (thickness of, for example, 100 nm or more and 300 nm or less) is formed on the patch electrode 15 and the first insulating layer 11. The second insulating layer 17 is not particularly limited, and for example, a silicon oxide ($SiO_2$) film, a silicon nitride (SiNx) film, a silicon oxynitride (SiOxNy; x>y) film, a silicon nitride oxide (SiNxOy; x>y) film, or the like can be suitably used. Here, the SiNx layer having a thickness of, for example, 200 nm is formed as the second insulating layer 17.

After that, the inorganic insulating films (the second insulating layer 17, the first insulating layer 11, and the gate insulating layer 4) are collectively etched by dry etching using, for example, a fluorine-based gas. In the etching, the patch electrode 15, the source bus line SL and the gate bus line GL function as an etch stop. As a result, a second contact hole reaching the gate bus line GL is formed in the second insulating layer 17, the first insulating layer 11, and the gate insulating layer 4, and a third contact hole reaching the source bus line SL is formed in the second insulating layer 17 and the first insulating layer 11. Further, a fourth contact hole reaching the patch connection part described above is formed in the second insulating layer 17.

Next, a conductive film (thickness of 50 nm or more and 200 nm or less) is formed on the second insulating layer 17, and in the second contact hole, the third contact hole, and the fourth contact hole by, for example, the sputtering method. As the conductive film, for example, a transparent conductive film such as an indium tin oxide (ITO) film, an indium zinc oxide (IZO) film, or a zinc oxide film (ZnO film) can be used. Here, the ITO film having a thickness of, for example, 100 nm is used as the conductive film.

Then, the transparent conductive film is patterned to form a gate terminal upper connection part, a source terminal upper connection part, and a transfer terminal upper connection part. The gate terminal upper connection part, the source terminal upper connection part, and the transfer terminal upper connection part are used to protect an exposed electrode or line at each terminal part. As described above, the gate terminal part GT, the source terminal part ST, and the transfer terminal part PT are obtained.

Then, a coating film is formed using an alignment agent described later so as to cover the second insulating film 17 and the like, and thereafter, the coating film is heated to remove the solvent and the like to form the alignment film OM1. Thus, the TFT substrate 101 can be produced. In the present description, the substrate in a state before the alignment film OM1 is formed may be referred to as a "pre-TFT substrate".

As described later, the alignment film OM1 is not subjected to the alignment treatment such as a rubbing treatment or photo-alignment treatment. Details of a method of forming the alignment film OM1 is described later.

(Structure of Slot Substrate 201)

Figure 6:
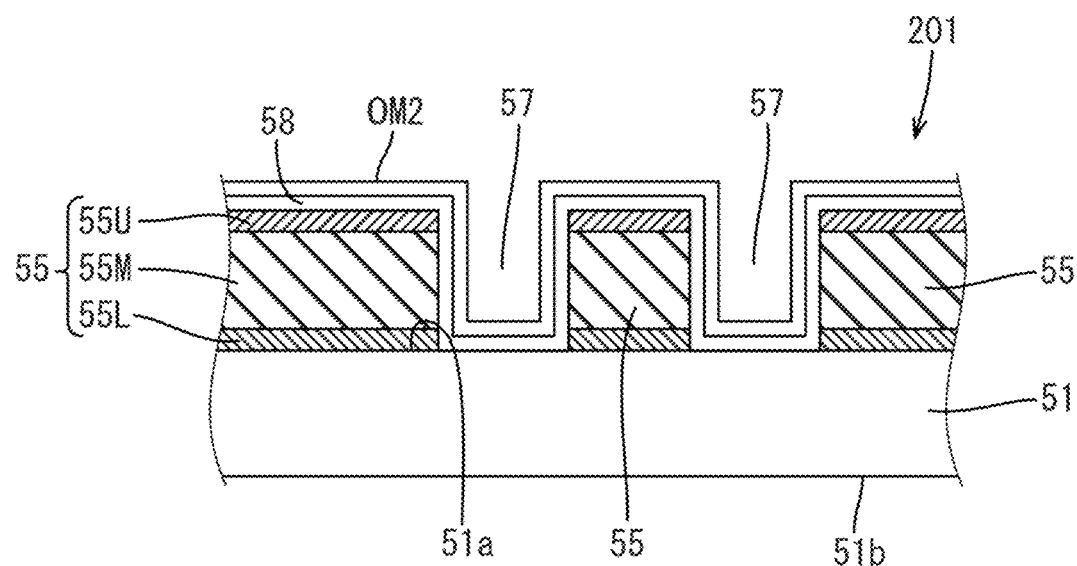
FIG. 6 is a cross-sectional view schematically showing an antenna unit region of the slot substrate.

Next, a structure of the slot substrate 201 is described more specifically. FIG. 6 is a cross-sectional view schematically showing the antenna unit region U of the slot substrate 201.

The slot substrate 201 mainly includes the dielectric substrate 51 (second dielectric substrate) and the slot electrode 55 formed on one plate surface 51a (plate surface facing the side of the liquid crystal layer and the side of the TFT substrate 101) of the dielectric substrate 51, a third insulating layer 58 covering the slot electrode 55, and the alignment film OM2 covering the third insulating layer 58.

In the transmission/reception region R1 of the slot substrate 201, the slots 57 are formed in the slot electrode 55 (see FIG. 3). The slots 57 are openings (groove parts) penetrating through the slot electrode 55. In this example, one slot 57 is allocated to each antenna unit region U.

The slot electrode 55 includes a main layer 55M such as a Cu layer or an Al layer. The slot electrode 55 may have a stacked structure including the main layer 55M, and an upper layer 55U and a lower layer 55L arranged to sandwich the main layer 55M. A thickness of the main layer 55M is set in consideration of the skin effect depending on material, and may be, for example, 2 μm or more and 30 μm or less. The thickness of the main layer 55M is typically set larger than thicknesses of the upper layer 55U and the lower layer 55L.

In this example, the main layer 55M is a Cu layer, and the upper layer 55U and the lower layer 55L are titanium (Ti) layers. By arranging the lower layer 55L between the main layer 55M and the dielectric substrate 51, adhesion between the slot electrode 55 and the dielectric substrate 51 can be improved. Further, by providing the upper layer 55U, corrosion of the main layer 55M (for example, the Cu layer) can be suppressed.

The third insulating layer 58 is formed on the slot electrode 55 and in the slots 57. Material of the third insulating layer 52 is not particularly limited, and for example, a silicon oxide (SiO$_2$) film, a silicon nitride (SiNx) film, a silicon oxynitride (SiOxNy; x>y) film, a silicon nitride oxide (SiNxOy; x>y) film, or the like is suitably used.

Similarly to the alignment film OM1 of the TFT substrate 101, the alignment film OM2 is made of a polyimide-based resin. Details of the alignment film OM2 is described later.

In each of the non-transmission/reception regions R2 of the slot substrate 201, the terminal part IT is provided (see FIG. 3). The terminal part IT includes a part of the slot electrode 55, the third insulating layer 58 covering a part of the slot electrode 55, and an upper connection part. The third insulating layer 58 has an opening (contact hole) reaching a part of the slot electrode 55. The upper connection part is in contact with a part of the slot electrode 55 in the opening. In the present embodiment, the terminal part IT is formed of a conductive layer such as an ITO film or an IZO film, is arranged in the seal region Rs, and is connected to the transfer terminal part PT of the TFT substrate 101 by a sealing resin containing conductive particles (for example, conductive beads such as gold (Au) beads).

The slot substrate 201 is produced, for example, by a method shown below. First, the dielectric substrate 51 is prepared. As the dielectric substrate 51, a substrate having high transmittance to electromagnetic waves (small dielectric constant and dielectric loss) such as a glass substrate and a resin substrate can be used. The dielectric substrate 51 preferably has a small thickness in order to suppress the attenuation of the electromagnetic waves. For example, after components such as the slot electrode 55 are formed on a surface of the glass substrate by a process described later, the glass substrate may be thinned from a back surface side. Thereby, the thickness of the glass substrate can be set to, for example, 500 μm or less. In general, the dielectric constant and the dielectric loss are smaller in resin than in glass. When the dielectric substrate 51 is made of a resin substrate, the thickness thereof is, for example, 3 μm or more and 300 μm or less. As material of a resin base, polyimide or the like is used.

By forming a metal film on the dielectric substrate 51 and patterning the same, the slot electrode 55 having the slots 57 is obtained. As the metal film, a Cu film (or Al film) having a thickness of 2 μm or more and 5 μm or less may be used. Here, a stacked film is used in which a Ti film, a Cu film, and a Ti film are stacked in this order.

Then, the third insulating layer 58 (thickness of, for example, 100 nm or more and 200 nm or less) is formed on the slot electrode 55 and in the slots 57. The third insulating layer 52 here is made of a silicon oxide (SiO$_2$) film.

Thereafter, in the non-transmission/reception region R2, the opening (contact hole) reaching a part of the slot electrode 55 is formed in the third insulating layer 58.

Then, by forming a transparent conductive film on the third insulating layer 58 and in the opening of the third insulating layer 58 and patterning the same, the upper connection part in contact with a part of the slot electrode 55 in the opening is formed, whereby the terminal part IT to be connected to the transfer terminal part PT of the TFT substrate 101 is obtained.

Then, a coating film is formed using an alignment agent described later so as to cover the third insulating layer 58 and the like, and thereafter, the coating film is heated to remove the solvent and the like to form the alignment film OM2. As described above, the slot substrate 201 can be produced. In the present description, the substrate in a state before the alignment film OM2 is formed may be referred to as a "pre-slot substrate".

As described later, similarly to the alignment film OM1, the alignment film OM2 is not subjected to the alignment treatment such as the rubbing treatment or photo-alignment treatment. Details of a method of forming the alignment film OM2 is described later.

(Configuration of Waveguide 301)

The waveguide 301 is configured such that the reflective conductive plate 65 faces the slot electrode 55 with the dielectric substrate 51 interposed therebetween. The reflective conductive plate 65 is arranged so as to face a back surface (outer main surface) of the dielectric substrate 51 with the air layer 54 interposed therebetween. Because the reflective conductive plate 65 constitutes the wall of the waveguide 301, it is preferable that a thickness thereof be three or more times, preferably five or more times a skin depth. As the reflective conductive plate 65, for example, an aluminum plate, a copper plate, or the like produced by shaving and having a thickness of several mm can be used.

For example, when the scanning antenna 1000 performs transmission, the waveguide 301 guides the microwaves supplied from the power feed pin 72 arranged at the center of the antenna units U aligned concentrically, to spread the microwaves radially outward. By cutting off the microwaves at each slot 57 of each antenna unit U when the microwaves move in the waveguide 301, an electric field is generated by the so-called principle of slot antenna, and the electric field causes charges to be induced in the slot electrode 55 (i.e., the microwaves are converted to vibration of free electrons in the slot electrode 55). By changing the capacitance value of the liquid crystal capacitance through controlling the orientation of the liquid crystal in each antenna unit U, a phase of vibration of free electrons induced in the patch electrode 15 is controlled. When the charges are induced in the patch electrode 15, the electric field is generated (that is, the vibration of free electrons in the slot electrode 55 moves to the vibration of free electrons in the patch electrode 15), and the microwaves (radio waves) are oscillated from the patch electrode 15 of each antenna unit U toward outside of the TFT substrate 101. The microwaves (radio waves) of different phases oscillated from each antenna unit U is added up to allow an azimuthal angle of the beam to be controlled.

In other embodiments, the waveguide may have a two-layer structure divided into upper and lower layers. In this case, the microwaves supplied from the power feed pin first move radially outward from the center in the lower layer to the outer side, and then rises to the upper layer at the outer wall portion of the lower layer and gathers toward the center in the upper layer from the outer side. With the two layer structure described above, the microwaves can be easily distributed uniformly to each antenna unit U.

Figure 7:
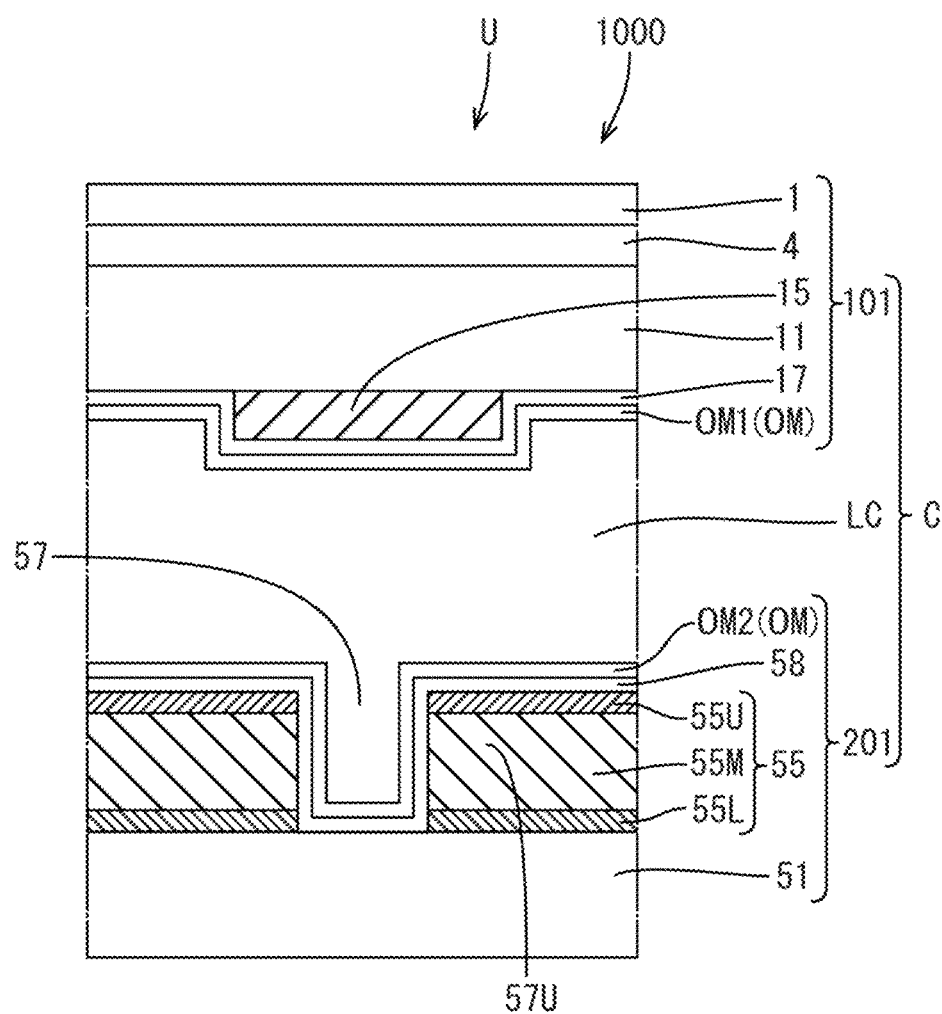
FIG. 7 is a cross-sectional view schematically showing the TFT substrate, a liquid crystal layer, and the slot substrate which constitute an antenna unit of the scanning antenna.

FIG. 7 is a cross-sectional view schematically showing the TFT substrate 101, the liquid crystal layer LC, and the slot substrate 201 which constitute the antenna unit U of the scanning antenna 1000. As shown in FIG. 7, in the antenna unit U, the island-shaped patch electrode 15 of the TFT substrate 101 and the hole-shaped (groove-shaped) slot 57 (slot electrode unit 57U) provided in the slot electrode 55 of the slot substrate 201 face each other in a manner of sandwiching the liquid crystal layer LC therebetween. The scanning antenna 1000 described above has a liquid crystal cell C including the liquid crystal layer LC, and a pair of TFT substrate 101 and slot substrate 201 respectively having the alignment films OM1, OM2 on the surfaces on the side of the liquid crystal layer LC with the liquid crystal layer LC interposed therebetween. In the present description, the antenna unit U is constituted by including one patch electrode 15 and the slot electrode 55 (slot electrode unit 57U) in which at least one slot 57 corresponding to the patch electrode 15 is arranged.

Figure 8:
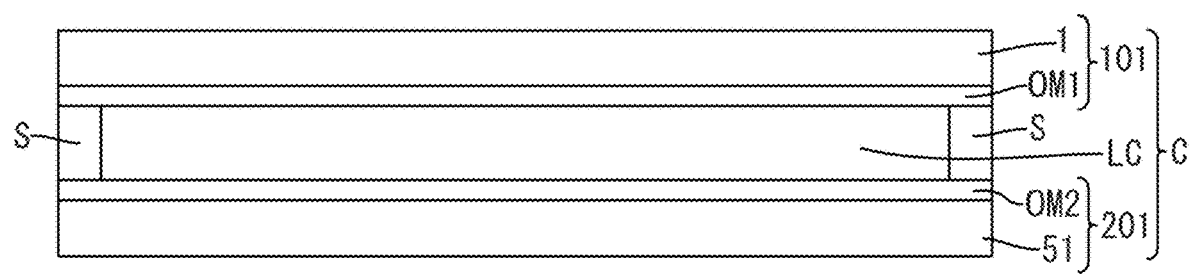
FIG. 8 is a cross-sectional view schematically showing a configuration of a liquid crystal cell.

FIG. 8 is a cross-sectional view schematically showing a configuration of the liquid crystal cell C. A sealing material S is arranged between the TFT substrate 101 and the slot substrate 201 which are the pair of substrates constituting the liquid crystal cell C, in a manner of surrounding the liquid crystal layer LC. The sealing material S adheres to the TFT substrate 101 and the slot substrate 201, and has a function of causing the TFT substrate 101 and the slot substrate 201 to adhere to each other. The TFT substrate 101 and the slot substrate 201 form the pair of substrates facing each other with the liquid crystal layer LC interposed therebetween.

The sealing material S is made of a cured product of a sealing material composition containing a curable resin. The sealing material composition of a non-solvent type is basically used. As the curable resin, a resin having a photo-curing property that cures with light (such as ultraviolet light and visible light) and/or a thermosetting property that cures with heat is used. The type of the sealing material S is appropriately selected depending on the method of injecting the liquid crystal material. For example, when the liquid crystal material is injected into the liquid crystal cell C by a one drop fill method (ODF method), as the curable resin, a curable resin having the photo-curing property (such as visible light curing property) and the thermosetting property is used for the reason of easily controlling the curing in two separate stages that are pre-curing and final curing. As the curable resin described above, for example, one that is made of a mixture of epoxy resin and acrylic resin (brand name "UVAC1561" (made by Daicel-UCB Company, Ltd.) or the like is mentioned. When the liquid crystal material is injected into the liquid crystal cell C by the vacuum injection method, a photocurable resin or thermosetting resin is used as the curable resin.

(Liquid Crystal Layer LC (Liquid Crystal Compound))

As the liquid crystal material (liquid crystal compound) constituting the liquid crystal layer LC, a liquid crystal compound having a large dielectric constant anisotropy (Δε) is used. For example, a liquid crystal compound having a dielectric constant anisotropy (Δε) of 10 or more is used. As a specific liquid crystal compound which has high polarity and can be used for the liquid crystal cell C for scanning antenna includes, for example, the liquid crystal compounds represented by the following chemical formulae (1-1) to (1-4) each having an isothiocyanate group (NCS group) at an end are mentioned.

[CHEMICAL FORMULA 1]

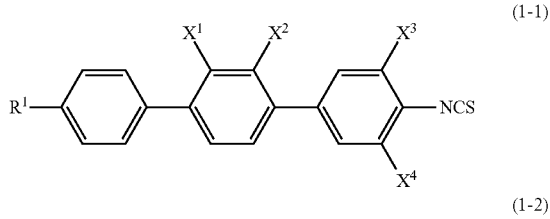

(1-1)

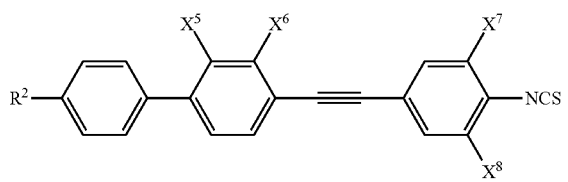

(1-2)

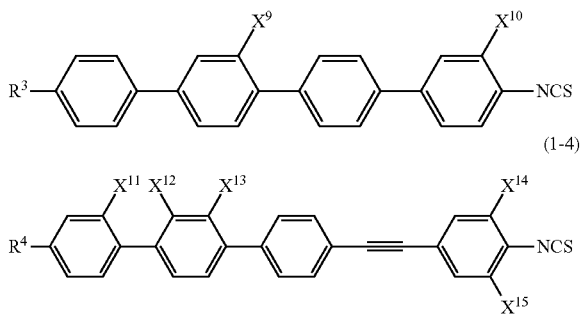

In the chemical formulae (1-1) to (1-4), each of $R^1$, $R^2$, $R^3$, and $R^4$ is a straight chain alkyl group having 2 to 5 carbon atoms (for example, ethyl group ($C_2H_5$), propyl group ($C_3H_7$), butyl group ($C_4H_9$), and pentyl group ($C_5H_{11}$)). In the above chemical formulae (1-1) to (1-4), $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, and $X^{15}$ are independent of each other, and are any of H (hydrogen atom), F (fluorine atom), $CH_3$ (methyl group), and Cl (chloro group).

For example, by appropriately combining the liquid crystal compounds represented by the above chemical formulae (1-1) to (1-4), a liquid crystal composition having the dielectric constant anisotropy (Δε) of 10 or more (1 kHz, 20° C.) can be obtained. The liquid crystal compound having high polarity as described above is suitable, for example, for a scanning antenna and a liquid crystal lens described later.

(Alignment Film OM (OM1, OM2))

As the alignment films OM1 and OM2 (hereinafter, may collectively be referred to as the "alignment film OM") used for the TFT substrate 101 and the slot substrate 201 of the present embodiment, one that is obtained by, for example, appropriately imidizing polyamic acid shown by the following chemical formula (2) is mentioned. Note that the alignment film OM of the present embodiment is not subjected to the alignment treatment by rubbing or light irradiation.

[CHEMICAL FORMULA 2]

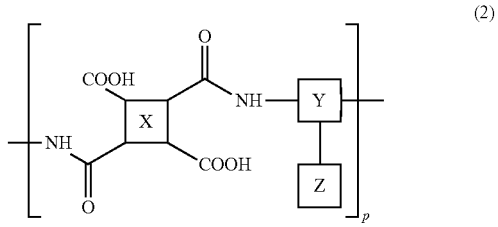

(2)

In the above chemical formula (2), p is an arbitral natural number. Further, in the chemical formula (2), X has structures represented by the following chemical formulae (3-1) to (3-16).

[CHEMICAL FORMULA 3]

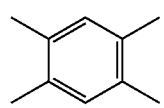

(3-1)

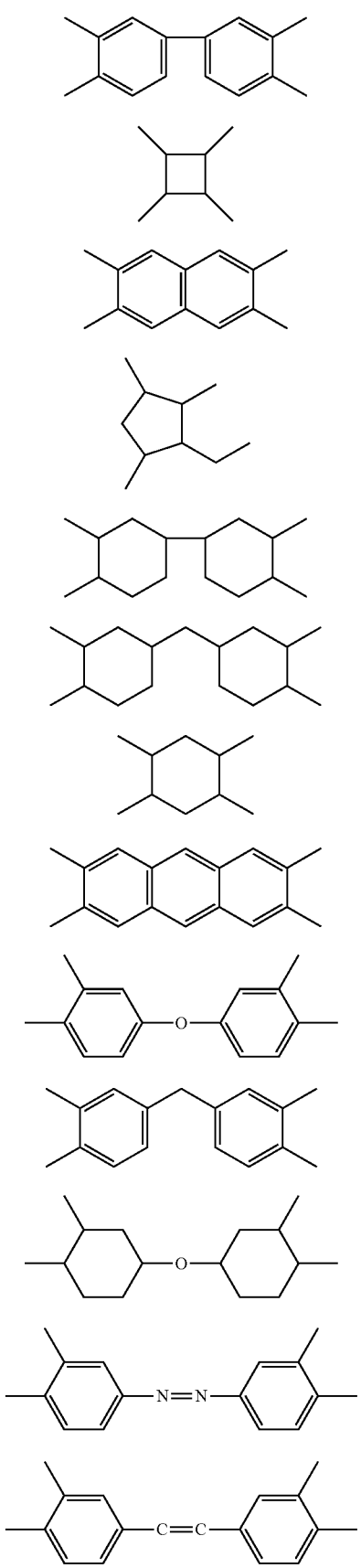
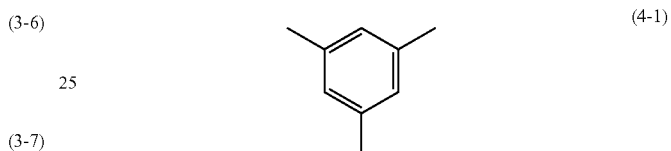
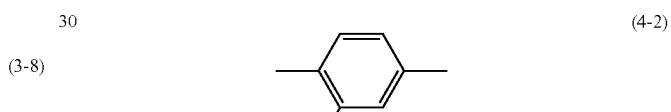
Further, in the chemical formula (2), Y has structures represented by the following chemical formulae (4-1) to (4-24).
[CHEMICAL FORMULA 4]
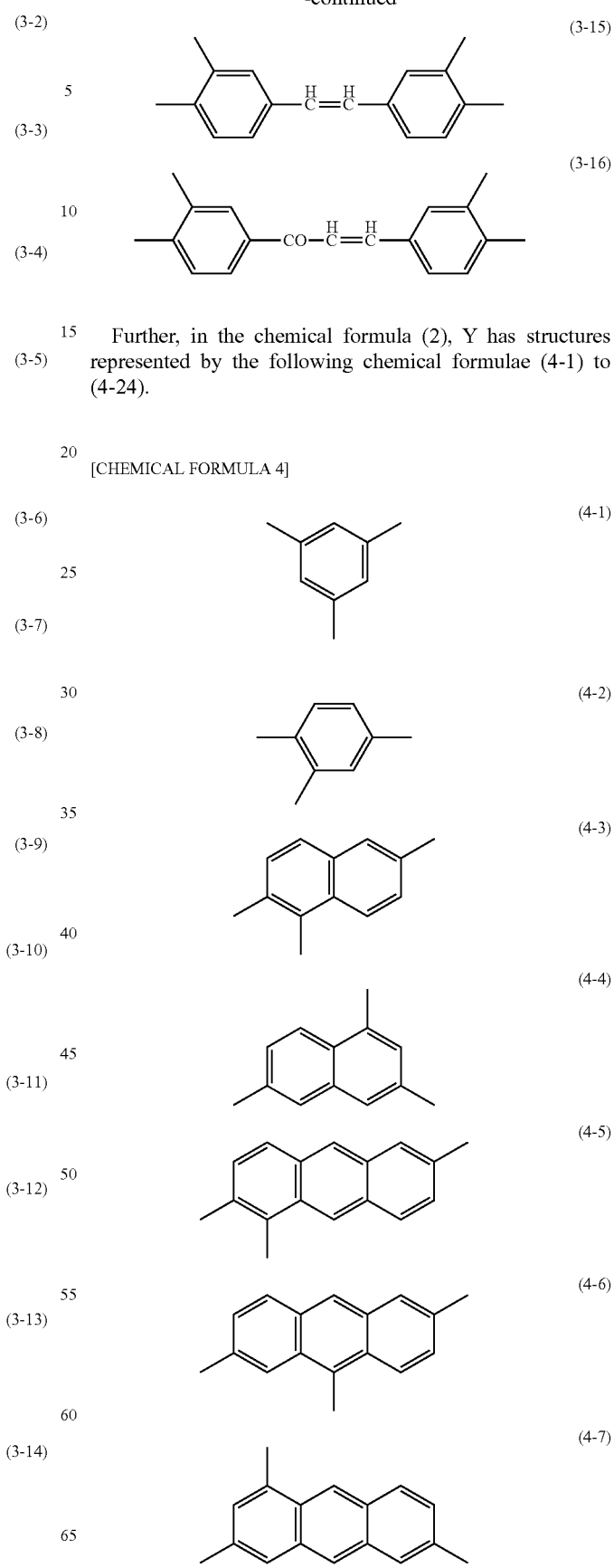

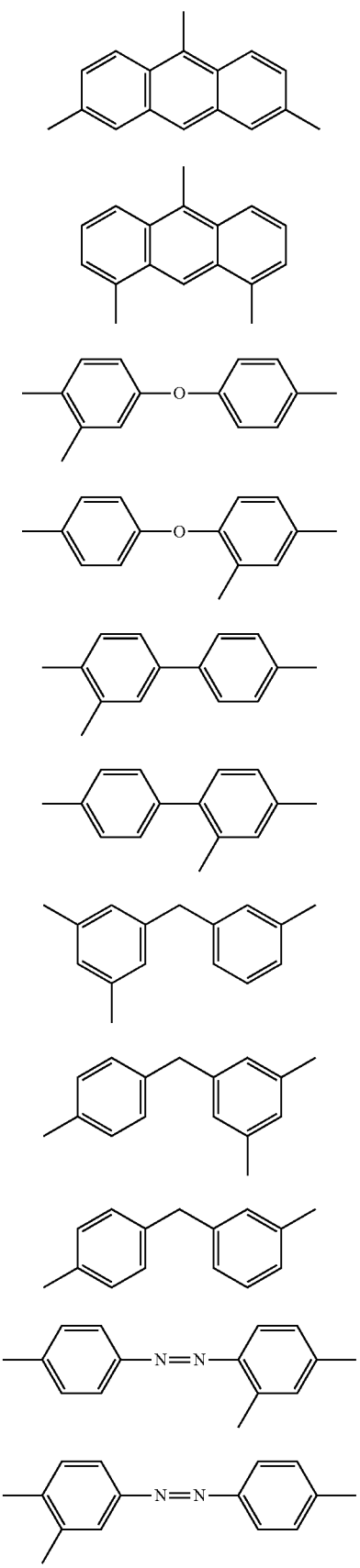
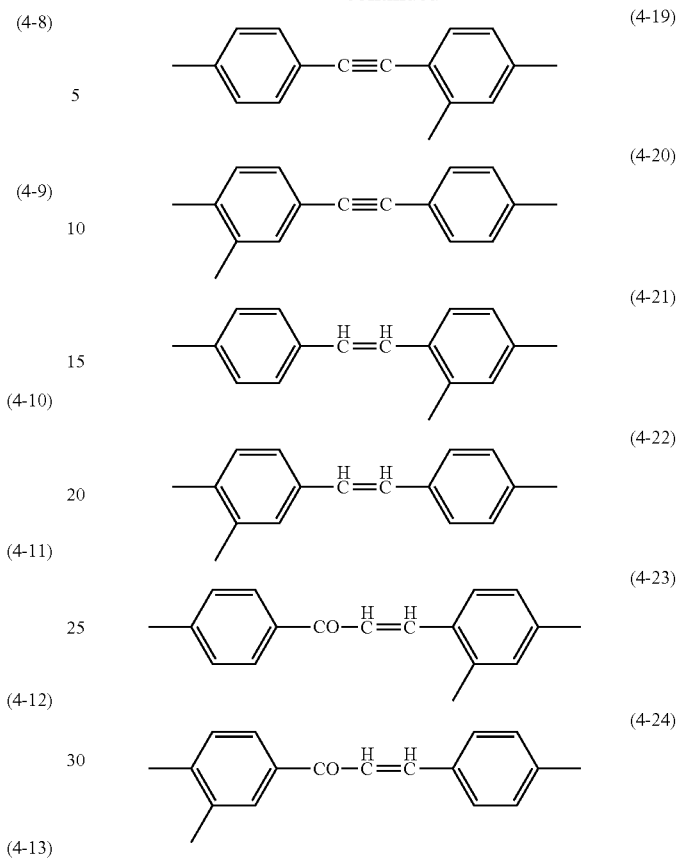

Further, in the chemical formula (2), Z represents a side chain. A structure of Z is not particularly limited as long as the object of the present invention is not impaired. Note that Z may not be present. In the chemical formula (2), when Z is not present, linking groups in the above chemical formulae (4-1) to (4-24) may be at any two places.

The imidization of the polyamic acid represented by the above chemical formula (2) is performed, for example, by heat-treating the polyamic acid at a high temperature (for example, 200 to 250° C.). Also, for example, chemical imidization may be used in which acetic anhydride or the like is used as a dehydrating agent and pyridine or the like is used as a catalyst.

The imidization ratio of the polyimide-based resin constituting the alignment film OM is not particularly limited as long as the object of the present invention is not impaired, and for example, preferably 40% or more and 95% or less.

The alignment film OM is an alignment film of a horizontally oriented type in which the orientation direction is horizontal to the substrate surface. As described later, a pretilt angle of liquid crystal molecules is controlled in a range of 1° or more and to 10° or less.

The polymerization method of the polyamic acid is not particularly limited, and known methods can be used. The polyamic acid is appropriately dissolved in an organic solvent to be prepared as a fluid or sol composition (alignment agent) having fluidity.

(Method of Forming Alignment Film)

In forming the alignment film OM, first, the alignment agent with flowability in an uncured state containing the polyamic acid represented by the above chemical formula (2) is applied on the surface of the pre-TFT substrate and the pre-slot substrate using a coating machine. The coating method is not particularly limited, and for example, a spin coater or the like is used.

The coating film formed of the applied matter on each substrate is first pre-baked (for example, heat-treated at 80° C. for 2 minutes) for the purpose of removing the organic solvent and the like, and then subjected to final baking (for example, heat-treated at 210° C. for 10 minutes) for the purpose of imidizing the polyamic acid and the like. The alignment film OM is obtained after the above heat treatment is applied to the coating film. The heating time and heating temperature in the pre-baking and the final baking are appropriately set depending on the purpose.

A thickness of the alignment film OM is not particularly limited as long as the object of the present invention is not impaired, and for example, is preferably 10 nm to 300 nm.

Further, as material constituting the alignment film OM, other materials such as polyamic acid other than the polyamic acid represented by the above chemical formula (2) or acrylic polymer may be used as long as the object of the present invention is not impaired.

Alignment Characteristics of Alignment Film OM

The alignment film OM of the present embodiment is not subjected to the alignment treatment by rubbing or light irradiation. In the alignment film OM described above, in a state in which voltage is not applied between the two substrates 101, 201, the liquid crystal molecules act so as to rise from the substrate surface in a polar angle direction at a predetermined angle (for example, 1 to 10°) and orient in all azimuthal angle directions.

Figure 9:
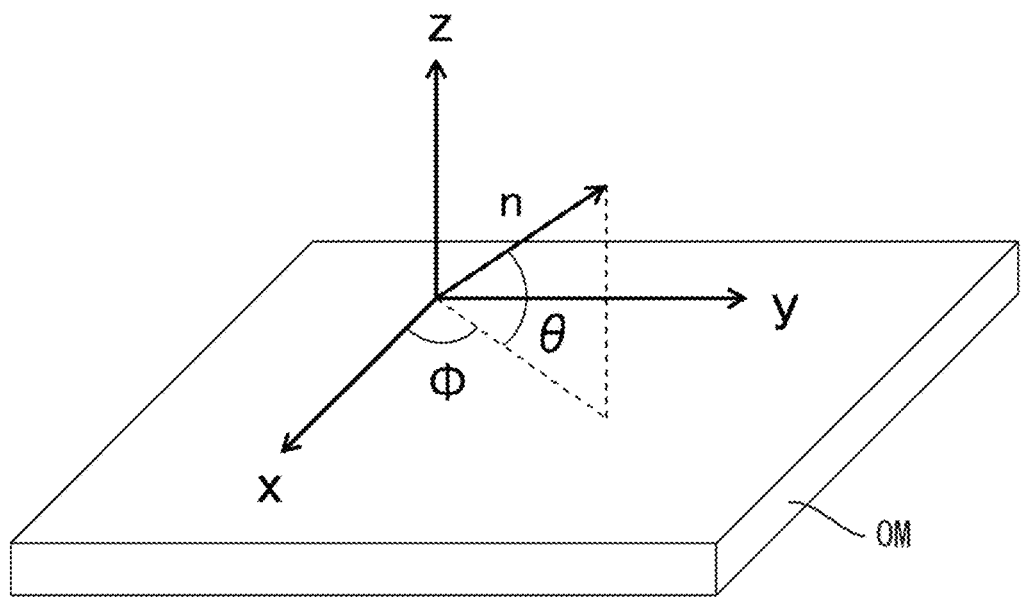
FIG. 9 is an explanatory view showing an orientation vector of a liquid crystal molecule oriented at a predetermined polar angle under action of an alignment film.

FIG. 9 is an explanatory view showing an orientation vector n of the liquid crystal molecule oriented at a predetermined polar angle θ under action of the alignment film OM. The orientation vector n shown in FIG. 9 is that of any liquid crystal molecule constituting the liquid crystal layer LC. Further, in FIG. 9, an X axis and a Y axis of orthogonal coordinate axes are arranged in a plane (substrate surface) of the alignment film OM, and a Z axis is arranged vertically above the alignment film OM.

The polar angle θ of the orientation vector n is an angle between the orientation vector n and an x-y plane, and means the pretilt angle of the liquid crystal molecule. An azimuthal angle Φ of the orientation vector n is an angle between the orientation vector n projected in the x-y plane and the x axis.

The liquid crystal molecule is inclined at the predetermined polar angle θ so as to rise slightly from the alignment film OM under the action of the alignment film OM.

The polar angle θ (pretilt angle) of the liquid crystal molecule is mainly determined by the interaction between the liquid crystal molecule and the alignment film OM. In the case of the present embodiment, the polar angle θ (pretilt angle) of the liquid crystal molecule is set in a range of 1° or more and to 10° or less. The polar angle θ of the above liquid crystal molecule can be adjusted by appropriately setting a structure of the liquid crystal molecule, a structure of the alignment film, the thickness of the alignment film, and the like.

In addition, the liquid crystal molecule is free in all azimuthal angle directions. Therefore, the azimuthal angle Φ of the liquid crystal molecule can be any value (angle) within a range of 0° to 360° (0°≤Φ<360°). Therefore, the entire liquid crystal molecules are oriented in all azimuthal angle directions with the predetermined pretilt angle in the direction of the polar angle θ.

Ideally, an orientation distribution in the azimuthal angle directions is uniformly present in the range of 0° to 360° (0°≤Φ<360°) for the entire liquid crystal molecules. Note that some liquid crystal molecules may be unintentionally oriented in a predetermined azimuthal angle direction due to the influence of a step on the substrate surface, an electrode shape, and the like, and in a precise sense, the orientation distribution in the azimuthal angle directions of the entire liquid crystal molecules may not be uniformly present in the range of 0° to 360° (0°≤Φ<360°). However, if the alignment film OM is not subjected to the alignment treatment (such as the rubbing treatment or photo-alignment treatment), normally, the alignment film OM acts upon the entire liquid crystal molecules to cause the entire liquid crystal molecules to orient in all azimuthal angle directions uniformly.

As described above, the alignment film OM of the present embodiment has a liquid crystal alignment force that aligns the liquid crystal molecules in all azimuthal angle directions at the predetermined pretilt angle, and largely differs from one of the conventional uniaxial orientation obtained by the alignment treatment such as rubbing or light irradiation. In addition, the liquid crystal alignment force of the alignment film OM also largely differs from one of the conventional multi-domain orientation having only a specific orientation direction achieved by optical alignment.

Figure 10:
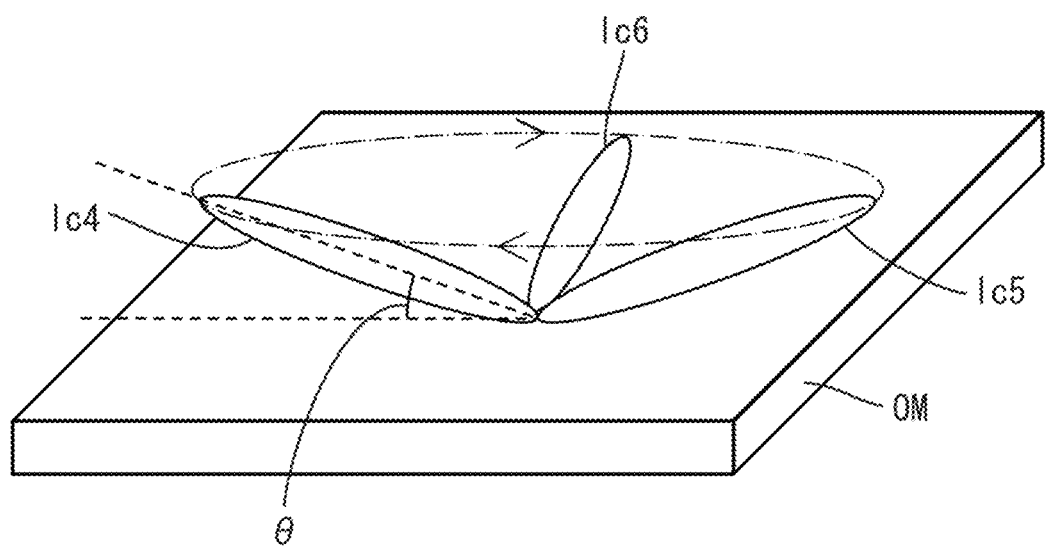
FIG. 10 is an explanatory view showing an orientation state of the liquid crystal molecules subjected to the action of the alignment film.

FIG. 10 is an explanatory view showing an orientation state of the liquid crystal molecules lc4, lc5, and lc6 under the action of the alignment film OM. The liquid crystal molecules lc4, lc5, and lc6 shown in FIG. 10 are oriented in directions of azimuthal angles different from each other in the presence of a predetermined pretilt angle under the action of the alignment film OM. In FIG. 10, the liquid crystal molecule lc4 and the liquid crystal molecule lc5 are shown to be oriented in directions different from each other by the azimuthal angle of 180° for the convenience of description. The liquid crystal molecules lc4, lc5, and lc6 are not constrained in all azimuthal angle directions, so the liquid crystal molecule lc6 between the liquid crystal molecule lc4 and the liquid crystal molecule lc5 can take a state of being energetically degenerated due to the requirement of the continuity of the liquid crystal orientation. Accordingly, in the present embodiment, generation of liquid crystal molecules (above third liquid crystal molecules) having the pretilt angle of 0° is suppressed, and an average pretilt angle of the entire liquid crystal molecules increases, and a response speed to capacitance modulation becomes fast.

(Orientation Distribution of Liquid Crystal Molecules)

In the present description, in the 100 μm×100 μm range (square range) of the antenna unit U, when an orientation degree A of the liquid crystal molecules is in a range of 1 to 10, the liquid crystal molecules in the liquid crystal cell C can be regarded such that the orientation distribution thereof in the azimuthal angle directions are uniformly present in the range of 0° to 360° (0°≤Φ<360°). The orientation degree A is defined by the equation "A=A1/A2".

In the above equation, A1 is a minimum value of light intensity obtained in a transmission mode or reflection mode of a polarization microscope with a photomultiplier (in principle, a value of the light intensity at the azimuthal angle where a probability of presence of the orientation vector of the liquid crystal is the highest), and A2 is a value of light intensity at an azimuthal angle obtained by adding 45° to the azimuthal angle at which A1 is obtained.

When the orientation degree A with the polarizing microscope is measured, a transparent portion is preferably measured in a condition of the transparent mode and crossed nicols, and a reflective electrode portion is desirably measured in the reflection mode. When the measurement cannot be performed in the transmission mode or reflection mode (for example, in the case of having a light shielding electrode which does not reflect light), the measurement is alternatively performed at a portion other than the antenna unit U that is not shielded from light.

The orientation degree A is preferably in a range of 1 to 3, and 1 is the most preferable. When the orientation degree A is 1, all liquid crystal molecules are oriented in all directions and randomly oriented, and therefore, it can be said to be the most preferable. Liquid crystal material in which the orientation degree A is 1 is referred to as a schlieren texture. For reference, the orientation degree in a general liquid crystal cell for liquid crystal display is 500 or more.

(Relationship Between Liquid Crystal Molecules and Electric Field Vector)

Figure 11:
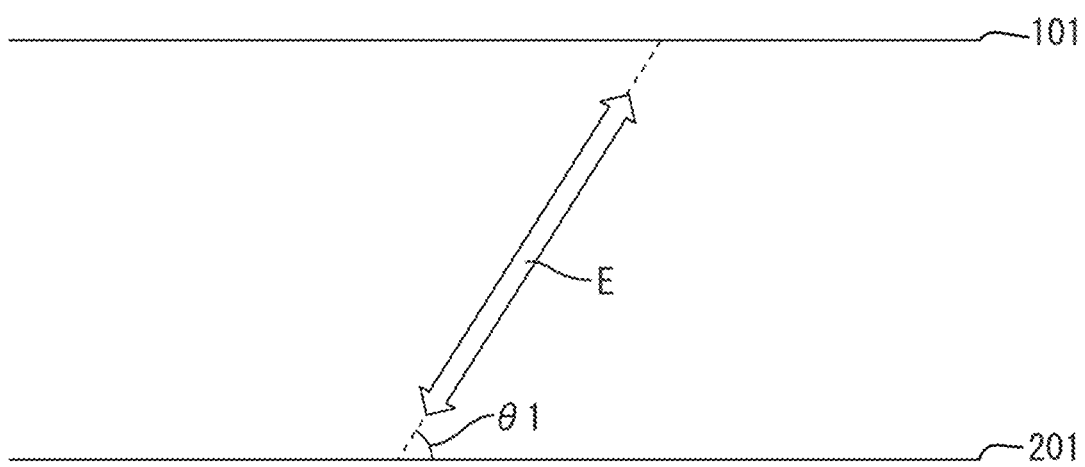
FIG. 11 is an explanatory view schematically showing a direction of an electric field vector when voltage is applied between the TFT substrate and the slot substrate.

FIG. 11 is an explanatory view schematically showing a direction of an electric field vector E when voltage is applied between the TFT substrate 101 and the slot substrate 201. The patch electrode 15 of the TFT substrate 101 and the slot electrode 51 of the slot substrate 201 are patterned in a predetermined shape to form the antenna unit U. When the voltage (AC voltage) is applied between the TFT substrate 101 and the slot electrode 201 which are provided with the above electrodes, an oblique electric field having an angle θ1 of less than 90° with respect to the substrate surface is generated between the two substrates 101, 201. In FIG. 11, a direction of the vector (electric field vector) E of the oblique electric field is schematically shown. That is, the patch electrode 15 and/or the slot electrode 51 is patterned such that the oblique electric field is applied between the TFT substrate 101 and the slot substrate 201. As described above, when the oblique electric field is applied between the two substrates 101, 201, the same effect as giving the predetermined pretilt angle to the liquid crystal molecules (positive liquid crystal molecules) can be obtained. In the case of negative liquid crystal molecules, the arrangement of the liquid crystal molecules is appropriately changed. Making the electric field vector be oblique to the substrate can be achieved by patterning the electrode, arranging a patterning dielectric on the electrode, and the like.

(Method of Producing Scanning Antenna)

First, a method of producing the liquid crystal cell C of the scanning antenna is described. As the method of injecting the liquid crystal layer LC (liquid crystal material) between the TFT substrate 101 and the slot substrate 201 of the liquid crystal cell C, for example, the ODF method or vacuum injection method is mentioned. Here, the method of producing the liquid crystal cell C using the vacuum injection method is described.

On any one of the TFT substrate 101 and the slot substrate 201 prepared in advance (on the TFT substrate 101 here), sealing material composition for vacuum injection method is applied using a seal plate or the like. The sealing material composition includes, for example, a thermosetting epoxy resin or the like.

Next, the sealing material composition on the substrate is heated and pre-cured. Then, the substrate (TFT substrate 101) and the other substrate (slot substrate 201) are caused to adhere to each other so as to sandwich the pre-cured sealing material composition. Thereafter, the sealing material composition is heated and finally cured to form an empty cell in which the TFT substrate 101 and the slot substrate 201 are caused to adhere to each other with the sealing material interposed therebetween.

Subsequently, the liquid crystal material is injected by an injection-vacuum method into the empty cell from an injection port provided in a part of the sealing material under reduced pressure. After that, under normal pressure, a thermosetting or photocurable sealing material composition is applied so as to block the injection port. Then, the sealing material composition is cured by heat or light (such as ultraviolet light), and the sealing material composition becomes a sealing part. As described above, the liquid crystal material can be injected into the liquid crystal cell C by using the injection-in-vacuum method.

After the liquid crystal material is injected into the liquid crystal cell C, the liquid crystal material is heat-treated under predetermined conditions (temperature, time). The temperature of the heat treatment of the liquid crystal material may be a nematic-isotropic phase transition temperature (Tni) or higher, or less than the nematic-isotropic phase transition temperature (Tni). When the liquid crystal material is heat-treated as described above, the liquid crystal cell C is obtained.

After the liquid crystal cell C is produced as described above, the reflective conductive plate 65 is appropriately assembled on a side of the cell so as to face the opposite surface of the slot substrate 201 (second dielectric substrate 51) with the dielectric (air layer) 54 interposed therebetween. The scanning antenna of the present embodiment is produced through the above steps.

Second Embodiment

Figure 12:
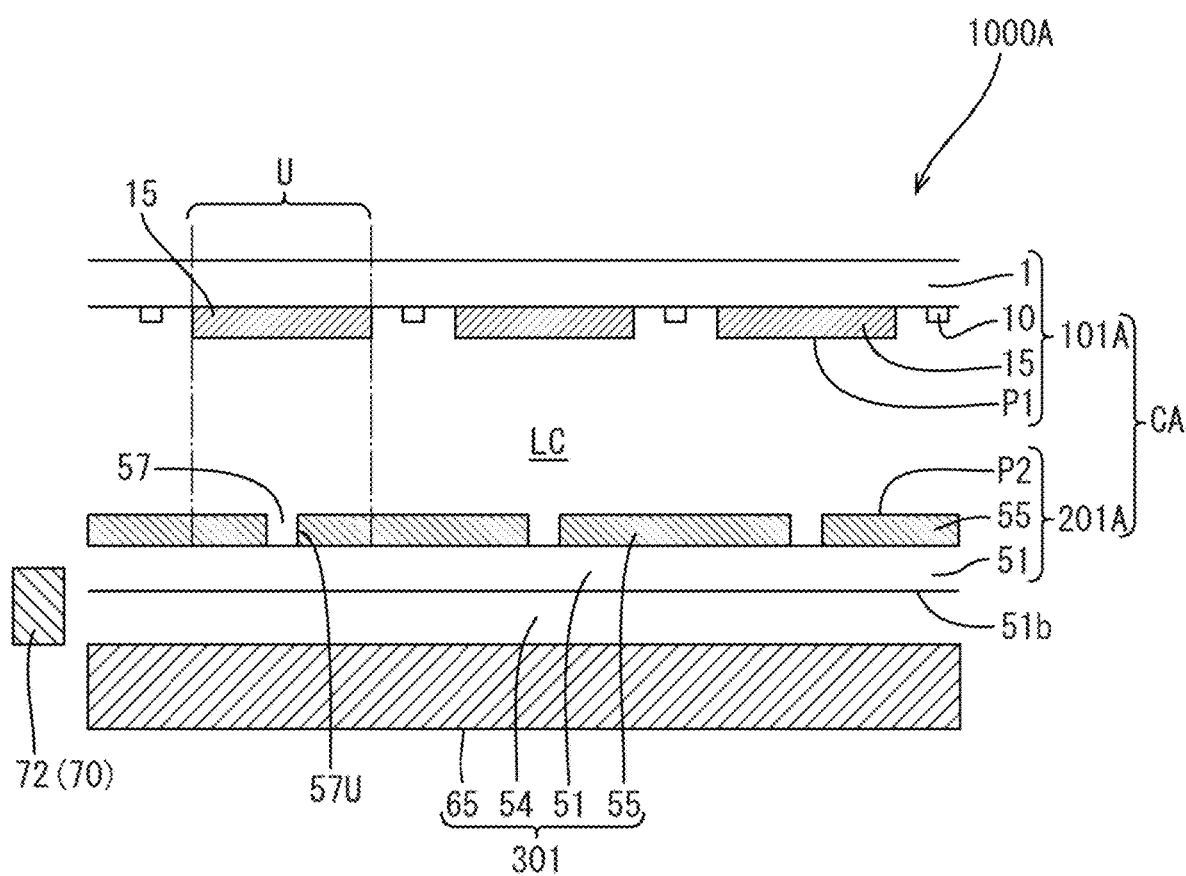
FIG. 12 is a cross-sectional view schematically showing a part of a scanning antenna according to a second embodiment.

Next, a scanning antenna 1000A according to a second embodiment of the present invention is described with reference to FIG. 12. FIG. 12 is a cross-sectional view schematically showing a part of the scanning antenna 1000A according to the second embodiment. The scanning antenna 1000A of the present embodiment is provided with a liquid crystal cell CA having a TFT substrate 101A, a slot substrate 201A, and a liquid crystal layer LC arranged therebetween. Both the TFT substrate 101A and the slot substrate 201A do not have alignment films as in the first embodiment, but instead, have hydrophilic surfaces P1, P2. A basic configuration (configurations other than the hydrophilic surfaces P1, P2) of the scanning antenna 1000A is the same as that of the first embodiment, and the description thereof is omitted. In FIG. 12, the same components as in the first embodiment are denoted by the same reference symbols as in the first embodiment. Note that the TFT substrate 101A in a state before the hydrophilic surface P1 is formed is referred to as a pre-TFT substrate, and the slot substrate 201A in a state before the hydrophilic surface P2 is formed is referred to as a pre-slot substrate. The pre-TFT substrate is obtained by removing the alignment film OM1 from the TFT substrate 101 of the first embodiment, and the pre-slot substrate is obtained by removing the alignment film OM2 from the slot substrate 201 of the first embodiment.

(Method of Forming Hydrophilic Surfaces P1, P2)

The hydrophilic surfaces P1, P2 are formed by bringing an alkaline aqueous solution (alkaline dilute solution) into contact with each of the surfaces (on the side of the liquid crystal layer LC) of the pre-TFT substrate and the pre-slot substrate to hydrophilize the surfaces of the pre-TFT substrate and the slot substrate. As an alkaline substance to be used, sodium hydroxide is mentioned, for example. An alkali concentration in the alkaline dilute solution is not particularly limited as long as the object of the present invention is not impaired, and is set to, for example, 0.1 to 10% by mass. As a specific alkaline dilute solution, for example, a sodium hydroxide aqueous solution (concentration of NaOH is 0.1 to 10% by mass) is mentioned.

The alkaline diluted aqueous solution is applied to the surface of the pre-TFT substrate and the surface of the pre-slot substrate using a known application method. After the alkaline diluted aqueous solution is applied to the pre-TFT substrate and the pre-slot substrate, the surface of the pre-TFT substrate and the surface of the pre-slot substrate may be washed with water (pure water), as needed.

When the hydrophilic surface P1 is formed on the surface of the pre-TFT substrate, the TFT substrate 101A is obtained, and when the hydrophilic surface P2 is formed on the surface of the pre-slot substrate, the slot substrate 201A is obtained. The liquid crystal cell CA can be produced basically in the same manner as in the first embodiment using the slot substrate 101A and the TFT substrate 201A.

Also in the steps of producing the liquid crystal cell CA of the present embodiment, after the liquid crystal material is injected into the liquid crystal cell CA, the liquid crystal material is subjected to heat treatment under predetermined conditions (temperature, time). The temperature of the heat treatment at the time may be the nematic-isotropic phase transition temperature (Tni) or higher, or less than the nematic-isotropic phase transition temperature (Tni).

As described above, when the TFT substrate 101A and the slot substrate 201A of the liquid crystal cell CA have the hydrophilic surfaces P1, P2, respectively, the hydrophilic group formed on the hydrophilic surfaces P1, P2 acts upon hydrophilic and hydrophobic groups of the liquid crystal molecules, which causes the liquid crystal molecules subjected to the action to be oriented in all azimuthal angle directions uniformly while having the predetermined pretilt angle (for example, 1° to 10°), in the state in which voltage is not applied between the two substrates 101A, 201A as in the first embodiment.

Further, as in the first embodiment, in the 100 μm×100 μm range (square range) of the antenna unit U, when the orientation degree A of the liquid crystal molecules is in the range of 1 to 10, the liquid crystal molecules in the liquid crystal cell CA can be regarded such that the orientation distribution thereof in the azimuthal angle directions are uniformly present in the range of 0° to 360° (0°≤Φ<360°). The method of measuring the orientation degree A, the preferable range and the like are the same as in the first embodiment.

Note that the heat treatment temperature of the liquid crystal material is preferably less than the nematic-isotropic phase transition temperature (Tni), from the viewpoint of easy alignment of the liquid crystal molecules in all azimuthal angle directions (easy adjustment of the orientation degree A from 1 to 10).

Also in the liquid crystal cell CA of the present embodiment, the generation of the liquid crystal molecules (above third liquid crystal molecules) having the pretilt angle of 0° is suppressed, and the average pretilt angle of the entire liquid crystal molecules increases, and the response speed to capacitance modulation becomes fast.

Also, after the liquid crystal cell CA is produced as described above, as in the first embodiment, the reflective conductive plate 65 is appropriately assembled on the side of the cell so as to face the opposite surface of the slot substrate 201A (second dielectric substrate 51) with the dielectric (air layer) 54 interposed therebetween. The scanning antenna of the present embodiment is produced through the above steps.

Third Embodiment

Figure 13:
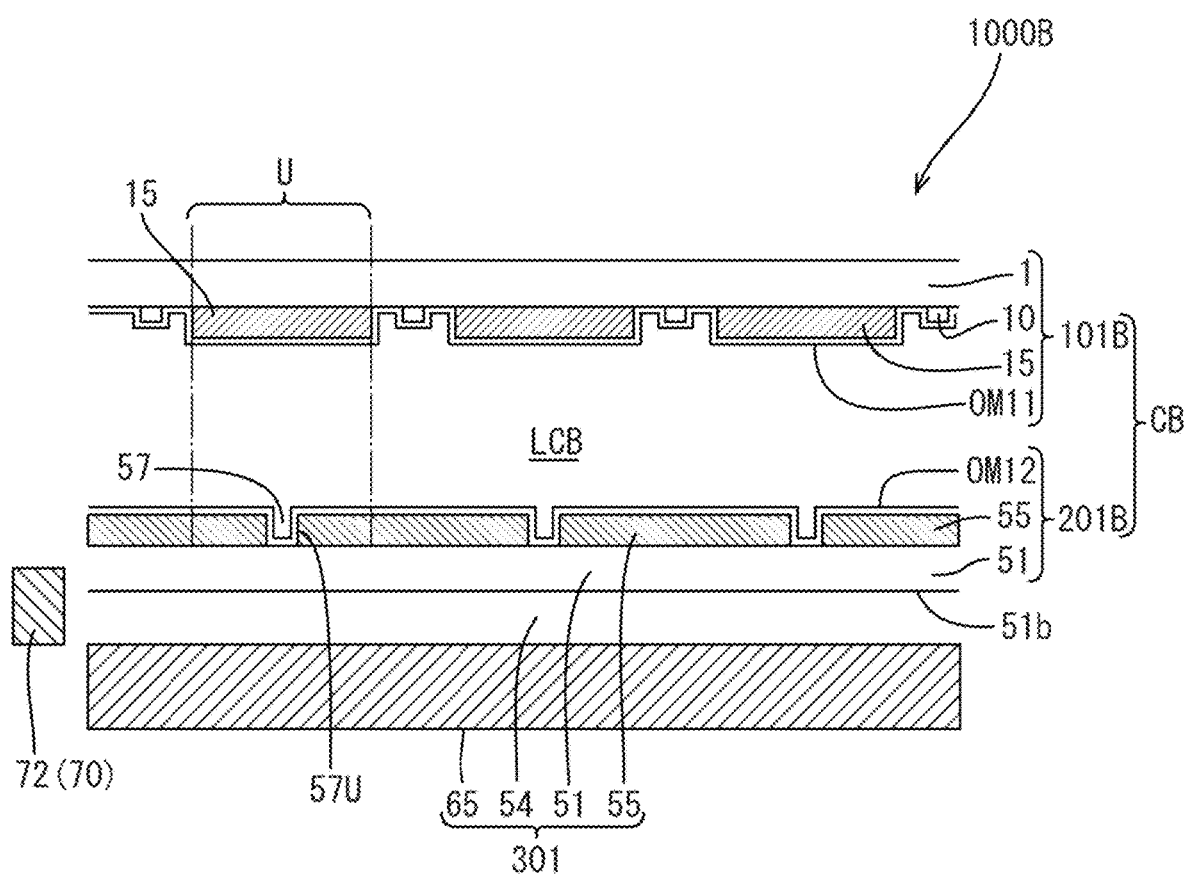
FIG. 13 is a cross-sectional view schematically showing a part of a scanning antenna according to a third embodiment.

Next, a scanning antenna B according to a third embodiment of the present invention is described with reference to FIG. 13. FIG. 13 is a cross-sectional view schematically showing a part of the scanning antenna 1000B according to the third embodiment. The scanning antenna 1000B of the present embodiment includes a liquid crystal cell CB having a TFT substrate 101B, a slot substrate 201B, and a liquid crystal layer LCB arranged therebetween. The liquid crystal material constituting the liquid crystal layer LCB of the present embodiment is formed by one that is heat-treated at a temperature less than the nematic-isotropic phase transition temperature (Tni) in a production process. The liquid crystal material described above exhibits an orientation (flow orientation) corresponding to a flow of the liquid crystal material generated when the liquid crystal material is injected into the liquid crystal cell CB (empty cell) in the production process of the liquid crystal cell CB. Further, an alignment film OM11 of the TFT substrate 101B and an alignment film OM12 of the slot substrate 201B are basically made of the same material as that of the first embodiment. In the case of the present embodiment, different from the first embodiment, each of the alignment films OM11, OM12 may be subjected to the alignment treatment such as the rubbing treatment or photo-alignment treatment. The basic configuration of other parts of the scanning antenna 1000A are the same as those of the first embodiment, and the description is omitted. In FIG. 13, the same components as in the first embodiment are denoted by the same reference symbols as in the first embodiment.

The TFT substrate 101B and the slot substrate 201B of the present embodiment have the same configuration as the TFT substrate 101 and the slot substrate 201 of the first embodiment except that the alignment films OM11, 12 are subjected to the alignment treatment. In the present embodiment, the alignment films OM11, 12 are not necessarily subjected to the alignment treatment, and the alignment treatment may not be performed as in the first embodiment. As the method of injecting the liquid crystal layer LCB (liquid crystal material) between the TFT substrate 101B and the slot substrate 201B described above, for example, the ODF method or vacuum injection method may be mentioned as in the first embodiment. Here, the method of producing the liquid crystal cell CB using the vacuum injection method is described.

On any one of the TFT substrate 101B and the slot substrate 201B prepared in advance (on the TFT substrate 101B here), the sealing material composition for vacuum injection method is applied using the seal plate or the like as in the first embodiment.

Next, the sealing material composition on the substrate is heated and pre-cured. After that, the substrate (TFT substrate 101B) and the other substrate (slot substrate 201B) are caused to adhere to each other so as to sandwich the pre-cured sealing material composition. Thereafter, the sealing material composition is heated and finally cured to form an empty cell in which the TFT substrate 101B and the slot substrate 201B are caused to adhere to each other with the sealing material interposed therebetween.

Figure 14:
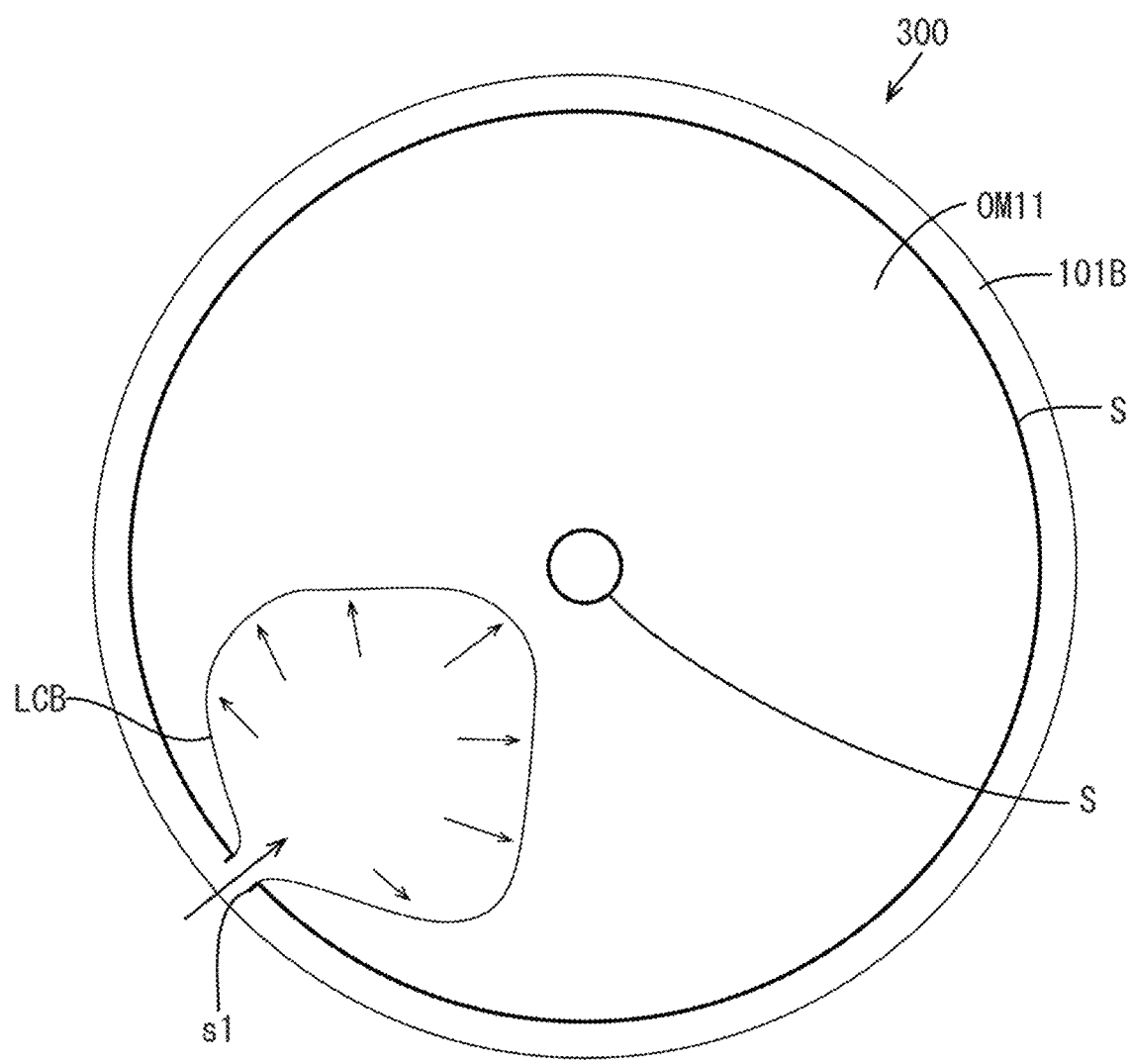
FIG. 14 is an explanatory view schematically showing how liquid crystal material is injected into an empty cell by a vacuum injection method.

FIG. 14 is an explanatory view schematically showing how the liquid crystal material (liquid crystal layer) LCB is injected into an empty cell 300 by the vacuum injection method. As shown in FIG. 14, the liquid crystal material is injected by the injection-in-vacuum method into the empty cell 300 from an injection port s1 provided in a part of the sealing material S under reduced pressure. For convenience of description, the slot substrate 201B of the empty cell 300 is omitted in FIG. 14.

Thereafter, under normal pressure, the thermosetting or photocurable sealing material composition is applied so as to block the injection port s1. Then, the sealing material composition is cured by heat or light (such as ultraviolet light), and the sealing material composition becomes a sealing part. As described above, the liquid crystal material can be injected into the liquid crystal cell C by using the injection-in-vacuum method.

Now, the liquid crystal material injected into the empty cell 300 as described above flows so as to spread planarly between the alignment film OM11 of the TFT substrate 101B and the alignment film OM12 of the slot substrate 201B, and finally, flows so as to fill without any gap therebetween. When the liquid crystal material flows in this manner, in the liquid crystal cell CB finally obtained, the liquid crystal molecules exhibit the flow orientation in which the liquid crystal molecules are oriented in all azimuthal angle directions uniformly while having the predetermined pretilt angle (for example, 1° to 10°), in the state in which voltage is not applied between the two substrates 101B, 201B as in the first embodiment.

As described above, after the liquid crystal material is injected into the liquid crystal cell CB, in the present embodiment, the liquid crystal material needs to be heat-treated at the temperature less than the nematic-isotropic phase transition temperature (Tni). When the liquid crystal material is heat-treated at the temperature the nematic-isotropic phase transition temperature (Tni) or higher, the flow orientation of the liquid crystal material (liquid crystal molecules) is eliminated, and the liquid crystal is subjected to the action of the alignment films OM11, OM12 subjected to alignment treatment, which causes the liquid crystal molecules to be oriented along a predetermined azimuthal angle direction.

Also in the present embodiment, as in the first embodiment, in the 100 μm×100 μm range (square range) of the antenna unit U, when the orientation degree A of the liquid crystal molecules is in the range of 1 to 10, the liquid crystal molecules in the liquid crystal cell CB can be regarded such that the orientation distribution thereof in the azimuthal angle directions are uniformly present in the range of 0° to 360° ($0° \leq \Phi < 360°$). The method of measuring the orientation degree A, the preferable range and the like are the same as in the first embodiment.

Also in the liquid crystal cell CB of the present embodiment, the generation of the liquid crystal molecules (above third liquid crystal molecules) having the pretilt angle of 0° is suppressed, and the average pretilt angle of the entire liquid crystal molecules increases, and the response speed to capacitance modulation becomes fast.

Also, after the liquid crystal cell CB is produced as described above, as in the first embodiment, the reflective conductive plate 65 is appropriately assembled on the side of the cell so as to face the opposite surface of the slot substrate 201B (second dielectric substrate 51) with the dielectric (air layer) 54 interposed therebetween. The scanning antenna of the present embodiment is produced through the above steps.

Although in the present embodiment, the liquid crystal material is made to exhibit the flow orientation by the vacuum injection method, in other embodiments, the liquid crystal material may be made to exhibit flow orientation by the ODF method. However, the vacuum injection method is preferable in consideration of damage to the liquid crystal molecules caused by seal curing light and decrease in a voltage holding ratio (VHR) associated therewith.

OTHER EMBODIMENTS

Other than the above embodiments, as in the first embodiment, the liquid crystal molecules are oriented uniformly in all azimuthal angle directions at the predetermined pretilt angle (for example, 1° to 10°) by subjecting the alignment film of the liquid crystal cell to the photo-alignment treatment with a correlation length of the liquid crystal material (liquid crystal molecules) or less. Even in the liquid crystal cell described above, the generation of the liquid crystal molecules (above third liquid crystal molecules) having the pretilt angle of 0° is suppressed, and the average pretilt angle of the entire liquid crystal molecules increases, and the response speed to capacitance modulation becomes fast.

EXAMPLES

Hereinafter, the present invention is described in more detail based on Examples. The present invention is not limited at all by these Examples.

Example 1

Production of Liquid Crystal Cell for Scanning Antenna

First, a TFT substrate having the same basic configuration as the TFT substrate 101 provided in the liquid crystal cell C of the above-described scanning antenna 1000, and a slot substrate having the same basic configuration as the slot substrate 201 also provided in the liquid crystal cell C were respectively prepared. An alignment film of the TFT substrate and an alignment film of the slot substrate were both formed using a polyimide-based alignment agent.

The polyimide-based alignment agent includes a liquid composition in which a polyamic acid (refer to the above chemical formula (2)) and an organic solvent are mixed.

In forming an alignment film on each of the TFT substrate and the slot substrate, first, the alignment agent was applied on each substrate using a spin coater, and a coating film made of the alignment agent was formed on each substrate. Subsequently, the coating film on each substrate was heated at 70° C. for 5 minutes and then further heated at 200° C. for 10 minutes to remove the solvent in the coating film, imidize the polyamic acid, and the like. Thus, the alignment film made of the alignment agent was formed on each surface of the TFT substrate and the slot substrate. The conventional alignment treatment (rubbing treatment, photo-alignment treatment) was not performed on the alignment film on each substrate.

In addition, on the TFT substrate and the slot substrate on each of which the alignment film was formed, measurement electrodes for measuring the VHR were respectively formed between the above substrates in an evaluation test to be described later. The measurement electrode is made of a transparent conductive film (ITO), and is formed on the surface on the side of the liquid crystal layer (under the alignment film) of each substrate. An area of each of the measurement electrodes in plan view is 1 cm$^2$ and the measurement electrodes are respectively provided on each substrate so as to face each other.

A thermosetting sealing material (trade name "HC-1413FP" produced by Mitsui Chemicals, Inc.) was drawn in a frame shape on the surface of the TFT substrate (on the side of the liquid crystal layer, the side of the alignment film) using a seal dispenser. Thereafter, the TFT substrate and the slot substrate were caused to adhere to each other with the sealing material interposed therebetween, and heated at 130° C. for 40 minutes to produce an empty cell in which the liquid crystal material was not enclosed. Then, a liquid crystal material ($\Delta\varepsilon$=20, 1 kHz, 20° C., Tni=120° C.) was enclosed in the empty cell by the vacuum injection method using the injection port provided in a part of the frame-shaped thermosetting sealing material. The injection port was sealed using a sealing material (trade name "TB3026E", produced by Three Bond Co., Ltd.).

Thereafter, the cell in which the liquid crystal material was enclosed was heated at 110° C. (temperature less than Tni of the liquid crystal material) for 20 minutes to heat-treat the liquid crystal molecules, and thereby a horizontally oriented type liquid crystal cell was obtained in which the liquid crystal molecules rose at a predetermined pretilt angle with respect to the substrate surface and were oriented in all azimuthal directions in the substrate surface.

The two substrates are designed such that electrodes are patterned and the oblique electric field is applied between the two substrates.

(Evaluation: Measurement of Response Time)

For the liquid crystal cell of Example 1, a response time to capacitance modulation was measured by the method shown below using the measurement electrode. By using a product name "AG1200" (produced by Yokogawa Electric Corporation) as an arbitrary waveform generator, a product name "TDS3034" (produced by Tektronix Inc. (produced by TFF Corporation)) as an oscilloscope, and a product name "high speed power amplifier 4055" (produced by NF Electronics Instruments, Inc.) as a voltage amplifier, a voltage response waveform of the liquid crystal cell of Example 1 was measured. The applied voltage was 10 kHz, 34 Vpp, and a triangular wave. A current I at V=0 during application of this triangular wave is derived from an equation I=dV/dt·C (dV/dt is time differential of potential difference between electrodes, and C is capacitance between electrodes). From a time-dependent plot of the capacitance C determined thereby, the response time to capacitance modulation defined as follows was measured. The response time was defined as the time to reach 95% of a value of the capacitance C at 16.67 ms (milliseconds) after applying the voltage.

As a result of the measurement, the response time of the liquid crystal cell of Example 1 was 1.5 ms (milliseconds), and it has been confirmed that the response speed was faster than that of the liquid crystal cell of Comparative Example 1 described later. The orientation degree of the liquid crystal cell of Example 1 was 1.

In the liquid crystal cell of Example 1, because the liquid crystal molecules are not constrained in all azimuthal angle directions, the liquid crystal molecules can exist in an energetically degenerated state due to the requirement of continuity of liquid crystal orientation (refer to the liquid crystal molecule lc6 of FIG. 10). Therefore, in Example 1, the generation of liquid crystal molecules (above third liquid crystal molecules) having the pretilt angle of 0° is suppressed, and it is presumed that the average pretilt angle of the entire liquid crystal molecules has increased, and the response speed to capacitance modulation has become fast.

Comparative Example 1

As in Example 1, a TFT substrate having the same basic configuration as the TFT substrate 101 provided in the above liquid crystal cell C, and a slot substrate having the same basic configuration as the slot substrate 201 also provided in the liquid crystal cell C were respectively prepared. An alignment film of the TFT substrate and an alignment film of the slot substrate were both formed using a polyimide-based alignment agent.

The polyimide-based alignment agent includes a liquid composition in which a polyamic acid (refer to the above chemical formula (2)) having an azobenzene structure as a photoreactive functional group is mixed with organic solvent.

Similarly to Example 1, the above alignment agent was applied on each substrate using the spin coater, and a coating film made of the above alignment agent was formed on each substrate. Next, the coating film on each substrate was heated at 70° C. for 5 minutes, and further heated at 220° C. for 40 minutes to remove the solvent in the coating film, imidize the polyamic acid, and the like. Thereafter, the photo-alignment treatment was performed in which the coating film of each substrate was irradiated with polarized ultraviolet light (wavelength of 365 nm) from the vertical direction under the condition of 5 J/cm$^2$.

Measurement electrodes similar to those of Example 1 were also formed on the TFT substrate and the slot substrate of Comparative Example 1.

In the same manner as in Example 1, a thermosetting sealing material was drawn in a frame shape on the surface of the TFT substrate (on the side of the liquid crystal layer, the side of the alignment film) using the seal dispenser. Thereafter, the TFT substrate and the slot substrate were caused to adhere to each other with the sealing material interposed therebetween, and heated at 130° C. for 40 minutes to produce an empty cell in which the liquid crystal material was not enclosed. Then, as in Example 1, the same liquid crystal material as that of Example 1 ($\Delta\varepsilon$=20, 1 kHz, 20° C., Tni=120° C.) was enclosed in the empty cell by the vacuum injection method using the injection port provided in a part of the frame-shaped thermosetting sealing material. The injection port was sealed using the same sealing material as in Example 1.

Thereafter, the cell in which the liquid crystal material was enclosed was heated at 130° C. (temperature higher than Tni of the liquid crystal material) for 20 minutes to heat-treat the liquid crystal molecules, and thereby a horizontally oriented type liquid crystal cell was obtained in which the liquid crystal molecules were uniaxially oriented in a predetermined azimuthal angle direction.

(Evaluation: Measurement of Response Time)

For the liquid crystal cell of Comparative Example 1, the response time to capacitance modulation was measured in the same manner as in Example 1. As a result, the response time of the liquid crystal cell of Comparative Example 1 was 1.9 ms (milliseconds). The orientation degree of the liquid crystal cell of Comparative Example 1 was 1,000.

Figure 15:
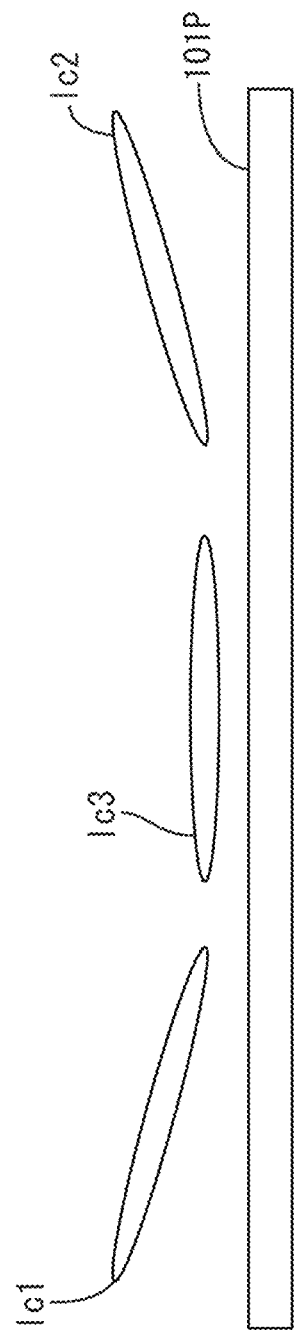
FIG. 15 is an explanatory view showing a state in which liquid crystal molecules are oriented along one direction with respect to a substrate surface by the action of an alignment film in the conventional liquid crystal cell.

In the liquid crystal cell of Comparative Example 1, the liquid crystal molecules are aligned along the predetermined azimuthal angle direction under the action of the alignment film. Accordingly, the liquid crystal molecules having the pretilt angle of 0° (refer to the third liquid crystal molecule lc3 in FIG. 15) are generated and it is presumed that the pretilt angle of the entire liquid crystal molecules has become smaller than that of Example 1. It is presumed that therefore, the response speed of the liquid crystal cell of Comparative Example 1 has become slow.

Example 2

A TFT substrate having the same basic configuration as the TFT substrate 101A having no alignment film and provided in the liquid crystal cell CA of the above-described scanning antenna 1000A, and a slot substrate having the same basic configuration as the slot substrate 201A having no alignment film and also provided in the liquid crystal cell CA were respectively prepared.

The surface (on the side of the liquid crystal layer) of each substrate was hydrophilized (a hydrophilic surface was formed) by washing the surface with a dilute aqueous solution of sodium hydroxide (concentration of NaOH of 2 wt %) and pure water. An alignment film made of organic material such as the polyimide-based resin was not formed on the surface of each substrate.

The measurement electrodes similar to those of Example 1 were also formed on the TFT substrate and the slot substrate of Example 2.

In the same manner as in Example 1, a thermosetting sealing material was drawn in a frame shape on the surface of the TFT substrate (on the side of the liquid crystal layer) using the seal dispenser. Thereafter, the TFT substrate and the slot substrate were caused to adhere to each other with the sealing material interposed therebetween, and heated at 130° C. for 40 minutes to produce an empty cell in which the liquid crystal material was not enclosed. Then, as in Example 1, the same liquid crystal material as that of Example 1 ($\Delta\varepsilon$=20, 1 kHz, 20° C., Tni=120° C.) was enclosed in the empty cell by the vacuum injection method using the injection port provided in a part of the frame-shaped thermosetting sealing material. The injection port was sealed using the same sealing material as in Example 1.

Thereafter, the cell in which the liquid crystal material was enclosed was heated at 110° C. (temperature less than Tni of the liquid crystal material) for 20 minutes to heat-treat the liquid crystal molecules, and thereby a horizontally oriented type liquid crystal cell was obtained in which the liquid crystal molecules rose at a predetermined pretilt angle with respect to the substrate surface and were oriented in all azimuthal directions in the substrate surface.

(Evaluation: Measurement of Response Time)

For the liquid crystal cell of Example 2, the response time to capacitance modulation was measured in the same manner as in Example 1. As a result, the response time of the liquid crystal cell of Example 2 was 1.5 ms (milliseconds). Accordingly, it has been confirmed that the response time is shorter and the response speed is faster in Example 2 than in above Comparative Example 1. The orientation degree of the liquid crystal cell of Example 2 was 1.

As in Example 2, even if the alignment film is not formed in the liquid crystal cell, instead, when the hydrophilic surface formed by the hydrophilization treatment is formed on each substrate, the liquid crystal molecules can be oriented in all directions in the substrate surface.

Example 3

As in Example 1, a TFT substrate having the same basic configuration as the TFT substrate 101 provided in the above liquid crystal cell C, and a slot substrate having the same basic configuration as the slot substrate 201 also provided in the liquid crystal cell C were respectively prepared. An alignment film of the TFT substrate and an alignment film of the slot substrate were both formed using the polyimide-based alignment agent containing the polyamic acid having the azobenzene structure as the photoreactive functional group, which was used in Comparative Example 1.

Similarly to Example 1, the above alignment agent was applied on each substrate using the spin coater, and a coating film made of the above alignment agent was formed on each substrate. Next, the coating film on each substrate was heated at 70° C. for 5 minutes, and further heated at 220° C. for 40 minutes to remove the solvent in the coating film, imidize the polyamic acid, and the like. Thereafter, the photo-alignment treatment was performed in which the coating film of each substrate was irradiated with polarized ultraviolet light (wavelength of 365 nm) from the vertical direction under the condition of 1 J/cm$^2$ (condition weaker than that of Comparative Example 1).

Measurement electrodes similar to those of Example were also formed on the TFT substrate and the slot substrate of the Example 3.

In the same manner as in Example 1, a thermosetting sealing material was drawn in a frame shape on the surface of the TFT substrate (on the side of the liquid crystal layer, the side of the hydrophilic surface side) using the seal dispenser. Thereafter, the TFT substrate and the slot substrate were caused to adhere to each other with the sealing material interposed therebetween, and heated at 130° C. for 40 minutes to produce an empty cell in which the liquid crystal material is not enclosed. Then, as in Example 1, the same liquid crystal material as that of Example 1 ($\Delta\varepsilon$=20, 1 kHz, 20° C., Tni=120° C.) was enclosed in the empty cell by the vacuum injection method using the injection port provided in a part of the frame-shaped thermosetting sealing material. The injection port was sealed using the same sealing material as in Example 1.

Thereafter, the cell in which the liquid crystal material was enclosed was heated at 110° C. (temperature less than Tni of the liquid crystal material) for 20 minutes to heat-treat the liquid crystal molecules, and thereby a horizontally oriented type liquid crystal cell was obtained in which the liquid crystal molecules rose at a predetermined pretilt angle with respect to the substrate surface and were oriented in all azimuthal directions in the substrate surface.

(Evaluation: Measurement of Response Time)

For the liquid crystal cell of Example 3, the response time to capacitance modulation was measured in the same manner as in Example 1. As a result, the response time of the liquid crystal cell of Example 3 was 1.6 ms (milliseconds). Accordingly, it has been confirmed that the response time of Example 3 is shorter and the response speed is faster than in above Comparative Example 1. The orientation degree of the liquid crystal cell of Example 3 was 10.

As in Example 3, even if the alignment film is subjected to the alignment treatment which is not essentially necessary to perform, when the alignment restriction force of the alignment film is not sufficient because the treatment conditions are weak or the thickness of the alignment film is thin, the flow orientation of the liquid crystal material is maintained as long as the liquid crystal material is not heated at a temperature of the nematic-isotropic phase transition temperature (Tni) or more. The flow orientation of the liquid crystal material is an orientation state of the liquid crystal material (liquid crystal molecules) formed by the liquid crystal material flowing and expanding when the liquid crystal material is injected into the empty cell. In the liquid crystal material exhibiting the flow orientation as described above, each liquid crystal molecule rises at the predetermined pretilt angle with respect to the substrate surface, and each liquid crystal molecule is oriented in all directions in the substrate surface.

In Example 3, although the photo-alignment treatment was performed as the alignment treatment, even if the alignment treatment was performed on the alignment film by rubbing, when the alignment restriction force of the alignment film is weak and the liquid crystal material can maintain the flow orientation, each liquid crystal molecule rises at the predetermined pretilt angle with respect to the substrate surface to be in a state of each liquid crystal molecule being oriented in all directions in the substrate surface.

EXPLANATION OF SYMBOLS

1: Dielectric substrate (First dielectric substrate)
3: Gate electrode
4: Gate insulating layer
5: Semiconductor layer
6D: Drain contact layer
6S: Source contact layer
7D: Drain electrode
7S: Source electrode
10: TFT
11: First insulating layer
15: Patch electrode
17: Second insulating layer
51: Dielectric substrate (Second dielectric substrate)
55: Slot electrode
55L: Lower layer
55M: Main layer
55U: Upper layer
57: Slot
57U: Slot electrode unit
58: Third insulating layer
70: Power feed device
72: Power feed pin
101, 101A: TFT substrate
201, 201A: Slot substrate
1000: Scanning antenna
U: Antenna unit (Antenna unit region)
CH1: Contact hole
LC: Liquid crystal layer
C, CA: Liquid crystal cell
GD: Gate driver
GL: Gate bus line
GT: Gate terminal part
SD: Source driver
SL: Source bus line
ST: Source terminal part
PT: Transfer terminal part
R1: Transmission/reception region
R2: Non-transmission/reception region
Rs: Seal region
S: Sealing material
OM, OM1, OM2: Alignment film
P1, P2: Hydrophilic surface

The invention claimed is:

1. A liquid crystal cell in which a plurality of antenna units are arranged, the liquid crystal cell comprising:
a thin film transistor (TFT) substrate including a first dielectric substrate, a plurality of TFTs supported by the first dielectric substrate, and a plurality of patch electrodes electrically connected to the TFTs;
a slot substrate including a second dielectric substrate and a slot electrode including a plurality of slots and supported by the second dielectric substrate; and
a liquid crystal layer sandwiched between the TFT substrate and the slot substrate that are disposed such that the patch electrodes and the slot electrode face each other,
wherein liquid crystal molecules included in the liquid crystal layer are oriented in all azimuthal angle directions in a state in which voltage is not applied between the patch electrodes and the slot electrode.

2. The liquid crystal cell according to claim 1, wherein the liquid crystal molecules are of a horizontally oriented type.

3. The liquid crystal cell according to claim 1, wherein
the TFT substrate includes a first alignment film on a surface thereof that is in contact with the liquid crystal layer, and
the slot substrate includes a second alignment film on a surface thereof that is in contact with the liquid crystal layer.

4. The liquid crystal cell according to claim 3, wherein the first alignment film and the second alignment film are not subjected to an alignment treatment.

5. The liquid crystal cell according to claim 3, wherein the first alignment film and the second alignment film are made of a polyimide-based resin.

6. The liquid crystal cell according to claim 1, wherein
the TFT substrate has a first hydrophilic surface formed by subjecting a surface in contact with the liquid crystal layer to a hydrophilization treatment, and
the slot substrate has a second hydrophilic surface formed by subjecting a surface in contact with the liquid crystal layer to the hydrophilization treatment.

7. The liquid crystal cell according to claim 6, wherein the first hydrophilic surface and the second hydrophilic surface are formed by bringing an alkaline dilute solution into contact with the surface in contact with the liquid crystal layer.

8. The liquid crystal cell according to claim 1, wherein the liquid crystal molecules included in the liquid crystal layer are in a flow orientation.

9. The liquid crystal cell according to claim 1, wherein the liquid crystal layer includes the liquid crystal molecules having a pretilt angle of 1° to 10°.

10. The liquid crystal cell according to claim 1, wherein the liquid crystal layer includes the liquid crystal layer having an orientation degree A in a range of 1 to 10.

11. The liquid crystal cell according to claim 1, wherein, in a state where voltage is applied between the slot electrode and the patch electrodes, the slot electrode and the patch electrodes form, between the slot electrode and the patch electrodes, an oblique electric field in which an angle of an electric field vector with respect to a substrate surface is less than 90°.

12. The liquid crystal cell according to claim 1, wherein the plurality of slots of the slot electrode are arranged to correspond to the plurality of patch electrodes so as to constitute the antenna unit.

13. The liquid crystal cell according to claim 1, wherein the liquid crystal layer contains the liquid crystal molecules having a dielectric constant anisotropy ($\Delta\varepsilon$) of 10 (1 kHz, 20° C.) or more.

14. The liquid crystal cell according to claim 13, wherein the liquid crystal molecules each have an isothiocyanate group at an end of the molecule.

15. A scanning antenna comprising:
the liquid crystal cell according to claim 1; and
a reflective conductive plate arranged so as to face an outer main surface of the second dielectric substrate of the liquid crystal cell with a dielectric layer interposed between the reflective conductive plate and the second dielectric substrate.

* * * * *